United States Patent
Friedman et al.

(10) Patent No.: US 12,365,295 B2
(45) Date of Patent: Jul. 22, 2025

(54) MODULAR FUEL CELL SYSTEM ARCHITECTURE AND HARNESS

(71) Applicant: TOYOTA MOTOR ENGINEERING & MANUFACTURING NORTH AMERICA, INC., Plano, TX (US)

(72) Inventors: Scott A. Friedman, Dallas, TX (US); Luke A. Rippelmeyer, Plano, TX (US); Christopher M. Bulpitt, Los Angeles, CA (US); Laura E. Bower, Whitmore Lake, MI (US); Arlo C. Eitzer, Ann Arbor, MI (US); Jonathan J. Sander, Greenville, OH (US); Daniel K. Lim, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 836 days.

(21) Appl. No.: 17/539,736

(22) Filed: Dec. 1, 2021

(65) Prior Publication Data

US 2023/0170513 A1  Jun. 1, 2023

(51) Int. Cl.
*B60R 16/02* (2006.01)
*H02G 3/08* (2006.01)

(52) U.S. Cl.
CPC ..... *B60R 16/0207* (2013.01); *H01M 2250/20* (2013.01); *H02G 3/08* (2013.01)

(58) Field of Classification Search
CPC ............ B60R 16/0207; B60R 16/0215; B60L 2200/44; B60L 2220/42; B60L 50/75;
(Continued)

(56) References Cited

U.S. PATENT DOCUMENTS

| | | |
|---|---|---|
| 5,512,022 A | 4/1996 | Suzuki |
| 6,405,818 B1 | 6/2002 | Anthony |
| (Continued) | | |

FOREIGN PATENT DOCUMENTS

| | | | |
|---|---|---|---|
| CN | 102079307 A | * | 6/2011 |
| CN | 104972918 | | 10/2015 |
| (Continued) | | | |

OTHER PUBLICATIONS

Marx et al., "A review of multi-stack and modular fuel cell systems: Interests, application areas and on-going research activities," International Journal of Hydrogen Energy vol. 39 Issue 23, Aug. 4, 2014., pp. 12101-12111.

(Continued)

*Primary Examiner* — Jean F Duverne
(74) *Attorney, Agent, or Firm* — SHEPPARD, MULLIN, RICHTER & HAMPTON LLP; Daniel N. Yannuzzi

(57) ABSTRACT

Systems and methods are provided to modularizing a device. In various embodiments, the harness in provided that accommodates many different configurations of the modules. The harness may function as a single element that needs to be replaced and/or connected to accommodate different configurations of modules. The harness may be modular. In various embodiments, unused lines of the harness are capped. In various embodiments, the cap completes a circuit, so that the control system interprets the systems as functioning despite the unused line, whereas the control system may shutdown the system is the unused line is left uncapped. In various embodiments, the harness is used to send control signals to elements of parallel power systems that have high voltage systems that are electronically isolated from one another.

20 Claims, 8 Drawing Sheets

(58) Field of Classification Search
CPC ...... B60L 2250/20; B60L 53/16; B60L 53/31; B60L 53/62; B60L 2200/36; B60L 58/18; B60L 50/70; B60L 50/71; H02G 3/08; H01M 8/249; B60K 1/04
See application file for complete search history.

(56) References Cited

U.S. PATENT DOCUMENTS

| | | | |
|---|---|---|---|
| 6,439,923 | B1 | 8/2002 | Kirkendall |
| 6,672,415 | B1 | 1/2004 | Tabata |
| 2003/0235740 | A1 | 12/2003 | Haltiner |
| 2004/0034460 | A1 | 2/2004 | Folkerts |
| 2004/0263099 | A1 | 12/2004 | Maslov |
| 2009/0025315 | A1 | 1/2009 | Gutfleisch |
| 2013/0151045 | A1 | 6/2013 | Park |
| 2013/0241445 | A1 | 9/2013 | Tang |
| 2014/0222265 | A1 | 8/2014 | Miftakhov |
| 2017/0361840 | A1 | 12/2017 | Valentine |
| 2018/0086343 | A1 | 3/2018 | Crain |
| 2019/0005183 | A1 | 1/2019 | Nada |
| 2019/0126864 | A1 | 5/2019 | Takamatsu |
| 2019/0222005 | A1 | 7/2019 | Steinkamp |
| 2020/0125858 | A1 | 4/2020 | Bauer |
| 2020/0366030 | A1 | 11/2020 | Go |
| 2021/0344214 | A1 | 11/2021 | Patel |
| 2022/0024433 | A1 | 1/2022 | Yuyama |
| 2022/0324322 | A1 | 10/2022 | Kim |

FOREIGN PATENT DOCUMENTS

| | | | | |
|---|---|---|---|---|
| CN | 108092211 | A | 5/2018 | |
| CN | 207853758 | | 9/2018 | |
| CN | 110085889 | | 8/2019 | |
| CN | 110521106 | | 11/2019 | |
| CN | 110876265 | A * | 3/2020 | ........... B60R 16/023 |
| CN | 210126492 | U | 3/2020 | |
| CN | 112036603 | A | 12/2020 | |
| EP | 1553422 | A1 * | 7/2005 | ........... B60R 16/023 |
| JP | 2012060729 | A | 3/2012 | |

OTHER PUBLICATIONS

Green Car Congress, "Plug power introduces new fuel-cell system for heavy-duty on-road applications," Feb. 18, 2020.
Wang et al., "Hydrogen consumption minimization method based on the online identification for multi-stack PEMFCs system," International journal of hydrogen energy, vol. 44, Issue 11, Feb. 26, 2019.

* cited by examiner

MODULAR FUEL CELL SYSTEM ARCHITECTURE AND HARNESS

TECHNICAL FIELD

The present disclosure relates generally to fuel cell systems in vehicles, and in particular, some implementations may relate to modular fuel cell system architectures which allow for mass production of fuel cell powertrain systems for a wide array of applications or vocations.

DESCRIPTION OF RELATED ART

Fuel cells may be stacked in a manner in which the fuel cells are in electrical communication for powering a system. Fuel cells can be used to power vehicles. An assembly line is sometimes used to aid mass production. When batteries and combustion engines are used together in a hybrid vehicle, at times the combustion engine recharges the battery.

BRIEF SUMMARY OF THE DISCLOSURE

In various embodiments a modular system is provided, the modular system comprising a harness comprising a first plurality of electrical lines that are configured to carry control signals, the plurality of electrical lines comprising: a first line comprising a first connection point to connect to a first modular power system that powers locomotion of a vehicle, the first line being coupled to carry control signals to the first modular power system; and a second line comprising a second connection point that connects to a second power system that is configured to power the locomotion of the vehicle, the second line being configured to carry control signals to the second modular power system; wherein the first line is communicatively isolated from the second line.

Embodiments of the modular system may include one or more of the following features. The first electrical line comprises a second electrical connection that is capped by a cap, where the cap when connected to the second electrical connection completes a circuit that would be left open, were the second electrical connection uncapped and unconnected. The first electrical power system and the second electrical power system are electrically isolated. The first line and the second line are part of a first harness, the modular system further comprising: a second harness that removably connects to the first harness; wherein the first harness comprises two connections, each of a plurality of the two connections being configured to send control signals to at least one high voltage battery system. The first line and the second line are part of a first harness, the modular system further comprising: an electrical harness that removably connects to the first harness; the second harness comprises a plurality of branches with each branch comprising a connector to communicatively couple to at least one fuel cell module to send control signals to the at least one fuel cell module. The first line and the second line are part of a first harness, the modular system further comprising: an electrical drive harness that is removably connectable to the first harness, the electrical drive harness comprising a plurality of connections to communicatively connect to components of a drive chain of a vehicle and to transmit controls signals between the components of the drive chain. The electrical drive harness further comprising a connection point that connects to a transmission to send control signals to the transmission. The electrical drive harness comprising a connection point that connects with a motor to send control signals to the motor. The electrical drive harness being connected to a control unit that controls modules connected to the electrical drive harness, via the electrical drive harness. The electrical drive being connected to a control unit that sends control signals via each of a plurality of parallel lines that connect to parallel power systems that power a vehicle.

In various embodiments a modular system is provided, the modular system comprising a harness configured to send a control signal, the harness comprising a plurality of connections; wherein a connection of the pluralities of connections is capped by a cap, wherein the cap when connected to a connection of the pluralities of connections completes a circuit that would be left open, were the connection of the plurality of connections left uncapped and unconnected.

Embodiments of the modular system may include one or more of the following features. The plurality of connectors comprising a connection to a controller, which when connected to the modular system, will not allow the modular system to run if the harness has an open circuit at one or more predetermined connection points of the plurality of connection points. The plurality of electrical connections comprise an electrical connection that connects to a control system of a power system that powers a vehicle. The plurality of electrical connections further comprising a first connection point and a second connection point, the harness further comprising: a first line comprising the first connection point that connects to, and sends control signals to, a first modular power system that powers locomotion of a vehicle; and a second electrical line comprising the second connection point that connects to, and via which control signals are sent to, a second power system that powers the locomotion of the vehicle, the first line being communicatively isolated from the second line. The plurality of electrical connections further comprising a first connection point, a second connection point, and a third connection point; a first electrical line comprising the first connection and the second connection; and a second line comprising the third connection point to send control signals to a second power system to power the locomotion of the vehicle; wherein the first connection point is a connection that connects to a high voltage battery system that has a high enough voltage to power the locomotion of the vehicle, the first electrical connection being a connection to send control signals to the high voltage battery. The modular system further comprising a high voltage junction box, one or more fuel cells being connected to the modular system on one side of the high voltage junction box, the high voltage junction box providing power on a second side of the high voltage junction box that powers low voltage components. The electrical harness comprises: a first harness comprising the plurality of electrical connections; and a second harness comprising connection point, the connection point of the second electrical harness being removably connectable to at least one of the plurality of connection points of the first electrical harness, via which control signals are transmittable between the first harness and the second harness. A third harness that removably connects to the first harness, the third electrical system comprising one or more connection points to connect to a fuel tank, and to send control signals to the fuel tank. The modular system further comprising: a third harness that removably connects to the first harness, the third harness comprising one or more connection points that connect to a control unit that sends control signals, via the first harness, second harness, and third harness, to power generation systems attach to the first harness and the second harness.

In various embodiments a method is provided, the method comprising: providing a harness comprising a plurality of electrically isolated lines; determining a structure to a vehicle; determining which of the electrically isolated lines will be needed to the structure of the vehicle; and capping the electrically isolated lines that are not needed for the structure of the vehicle. The method may be used with any of the above embodiments and/or with any of the embodiments disclosed herein.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide a modular vehicle architecture.

Figure 6:
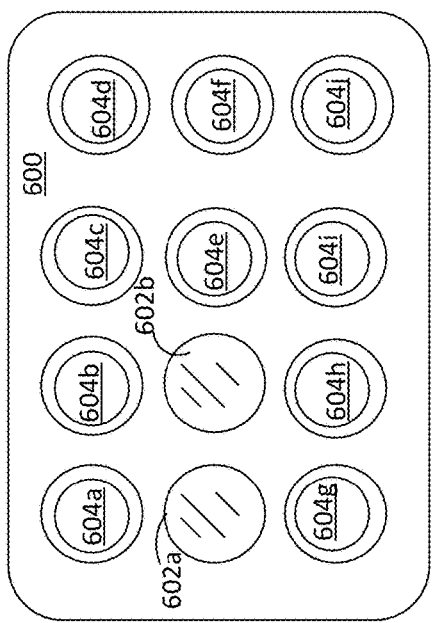
FIG. 6 illustrates an example connector that includes capped lines that may be used in the harness of FIG. 5
Figure 7:
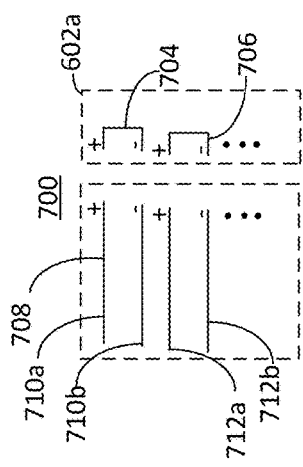
FIG. 7 illustrates various embodiments of a circuit diagram representing the circuit of a cap.
Figures 8, 9:
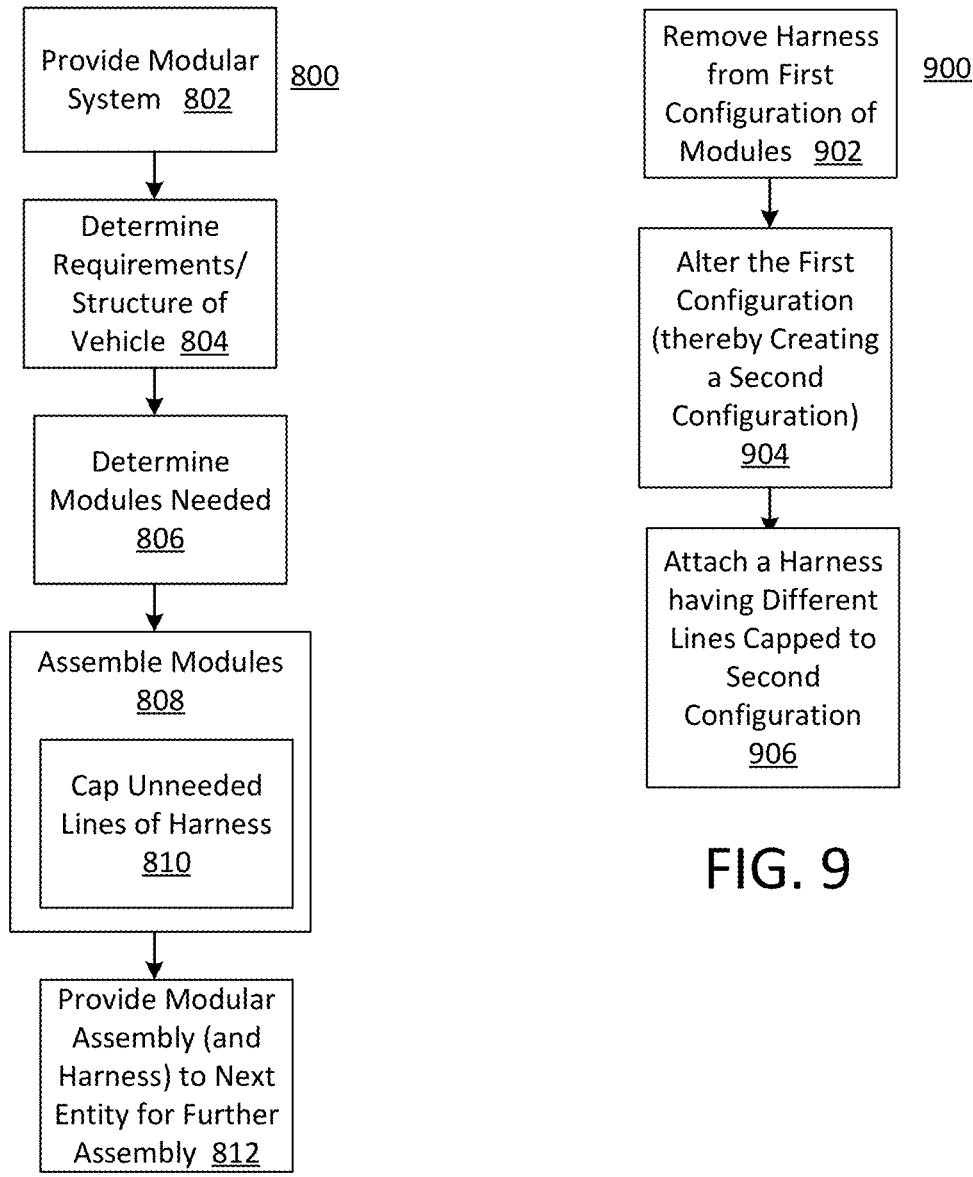
FIG. 8 illustrates a flowchart of operations comprising a method of building the system of FIGS. 1-7.
FIG. 9 illustrates a flowchart of operations comprising a method of changing the configuration of modules that will be used in the system of FIGS. 1-7.

FIGS. 1-7 describe a modular system in which a vehicle may be put together in a modular fashion, so as to accommodate a variety of OEM vehicle configurations, whereas FIG. 8 describes methods of assembling the modular system of FIGS. 1-7 and FIG. 9 describes methods of reconfiguring the system of FIGS. 1-7. The modular system may include a mass-producible modular fuel cell powertrain system with an architecture that is adaptable and/or may be customized for a large variety of vehicles. The manufacturer may control the communications of the components with each other, power delivery from fuel cell and battery to powertrain, at least on the manufacturer's side of the system.

Optionally, in various embodiments different parts of the system are constructed by different entities. There may be a first entity that supplies parts to a second entity, and the second entity may have a choice as to what components are supplied by the first entity. The second entity may also use the component provided for building a variety of different types of systems. In various embodiments, an electrical harness is provided by the first entity, to accommodate various choices of the second entity.

In various embodiments, the system provides a single, modular fuel cell powertrain system provided with various features that can be modified and customized for a particular engine bay, vehicle design, and/or truck design. By providing a harness that have connection points for a number of different options, to accommodate different configurations of the modules, one may only need to do little more than disconnect the harness from modules being removed and/or connect the harness to modules being added to accommodate different configurations of modules.

Optionally, the harness may have modules that are provided with specific modules of a vehicle, if included, and the modules of the harness only need to be disconnected or connected when adding or removing the modules of the vehicle that the module of the harness is associated with. Optionally, the lines of the harness that are not in use are capped.

Optionally, the cap completes a circuit, and the ECU that sends signals down the unused line (and/or the EH ECU or a global ECU) interprets the closed circuit as a working system, and an open circuit as a defective system and may shutdown the system is the line that is not used is left with an open circuit. In the embodiments in which unused lines are capped, to accommodate different configurations of the modules, one only needs to cap the unused lines and/or replace the harness or a module of the harness with a harness of a module of the harness, that is properly capped. The capping may be required of all unused lines, of only some specific lines if not used, or of only one specific line if not used. In various embodiments, there may be one or more modules of the harness associated with a first subentity of an entity (e.g., a first division of a manufacturer, which may be located at a different location), and one or more modules of the harness associated with a second subentity (e.g. a second division of a manufacturer) of the harness. The first subentity may ship the parts made by the first subentity to the second subentity, and then the second subentity only needs to attach the harness associated with the first subentity to for the parts made by the first subentity to function properly. In various embodiments, the harness includes a connection for a second entity (e.g., an OEM) to connect ECUs and/or other components to the system (such as another harness).

Figure 1:
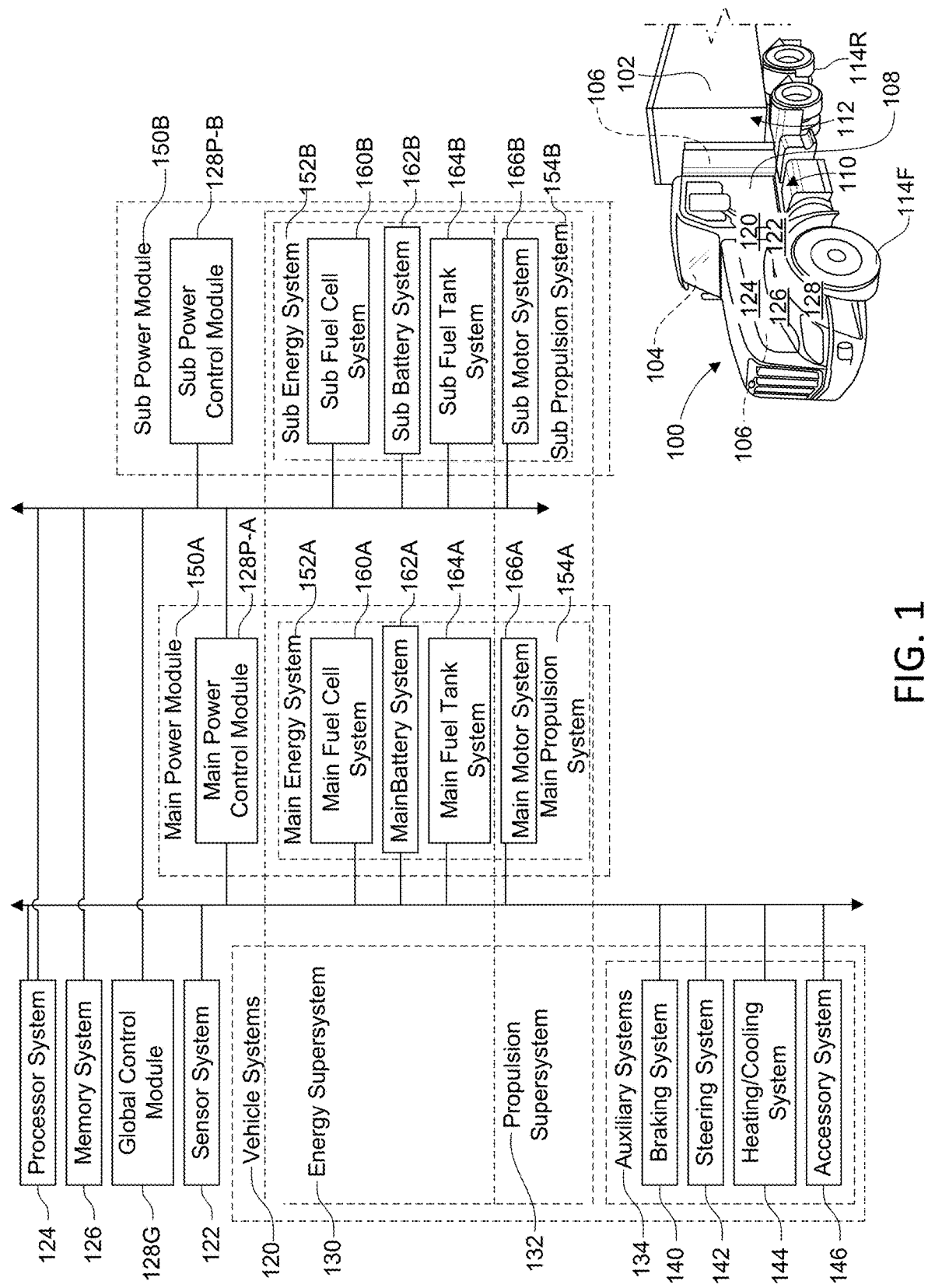
FIG. 1 illustrates various embodiments of a modular system.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example fuel cell vehicle (FCV) in which embodiments of the disclosed technology may be implemented is illustrated in FIG. 1. Although the example described with reference to FIG. 1 is a fuel cell type of vehicle, the systems and methods for modular vehicles can be implemented in other types of vehicle including gasoline- or diesel-powered vehicles, fuel-cell vehicles, electric vehicles, or other vehicles.

FIG. 1 illustrates an embodiment of a system 100, which may include a semi-tractor fuel cell vehicle in which the modular fuel cell architecture may be included. The system 100 of FIG. 1, which may be a fuel cell vehicle (FCV), is just one example of an electrified vehicle, within which the modular fuel cell architecture may be included. System 100 may have a modular construction. To facilitate the modular construction, the different parallel systems that power system 100 are kept electrically isolated. By keeping the parallel system electrically isolated, each parallel system can be added and/or removed without having an effect on the other parallel systems (e.g., other than the need for using a different electrical harness). In system 100, the torque request may be distributed between parallel and optionally systems having electrically isolated high voltage systems.

Although a semi-tractor fuel cell vehicle is used as an example, any vehicle may be substituted. In other embodiments, system 100 may be any system that is powered by engines. Different parts of system 100 may be supplied by different entities. For example, a first sub entity (e.g., a first division of an original manufacturer) may supply and/or assemble a first set of components, a second sub entity (e.g. a second division of the original manufacturer) may supply and/or assemble a second set of components, and/or second entity (e.g., a second company, which may be an Original Equipment Manufacturer (OEM)) may supply and/or assemble a second set of components. In this specification, whenever a "first sub entity" is mentioned a first entity, first manufacturer may be substituted whenever a "manufacturer" is mentioned a first entity maybe substituted. In this specification, whenever a "second subentity" is mentioned a subentity of a first entity, a second entity of a manufacturer and/or second manufacturer may be substituted whenever a "second manufacturer" is mentioned a first subentity maybe substituted. In this specification, whenever an "OEM" is mentioned a second entity may be substituted whenever a "second entity" is mentioned an OEM maybe substituted. It may be desirable that the components are modular, and that the modules fit together in a modular manner and/or electrically connected by a modular harness, so that the same modules may be used in different vehicles having different chassis, power requirements, types of fuel cells, and/or different numbers of fuel cell systems.

In this description, uses of "front," "forward" and the like, and uses of "rear," "rearward" and the like, refer to the longitudinal directions of the system 100. "Front," "forward" and the like refer to the front (fore) of the system 100, while "rear," "rearward" and the like refer to the back (aft) of the system 100. Uses of "side," "sideways," "transverse" and the like refer to the lateral directions of the system 100, with "driver's side" and the like referring to the left side of the system 100, and "passenger side" and the like referring to the right side of the system 100.

In various embodiments, system 100 is a semi-tractor or, in other words, a tractor unit that, together with a hitched semitrailer 102, forms a semi-truck. In other embodiments system 100 may be another type of vehicle. System 100 may have an exterior compartment and one or more interior compartments. The compartments of system 100 may include a passenger compartment 104 and/or one or more engine compartments 106. System 100 may include, among other things, seats and a dash assembly housed in its passenger compartment 104.

System 100 may have a body 108 that forms its exterior and defines the compartments of system 100. Body 108 may have upright sides, a floor, a front end, a rear end, and/or a roof, for example. In the embodiments in which system 100 is a semi-truck, the semitrailer 102 similarly may have an exterior and an interior. Semitrailer may also have an interior compartment and/or a cargo compartment for carrying cargo, which may be an exterior compartment. In addition to body 108, system 100 may have a chassis 110. Chassis 110 may serve as an underbody for system 100. Chassis 110, like the body 108, forms the exterior of the system 100. As part of the chassis 110, the system 100 may include a hitch 112 for hitching semitrailer 102 to system 100. With the semitrailer 102 hitched to system 100, system 100 may be capable of pulling semitrailer 102 and any onboard cargo. In an embodiment, system 100 may be built and/or assembled by a different entity than the entity (or entities) that builds/assembles part of the engine.

System 100 may include a modular drivetrain. The drivetrain may be part of, mounted to, or otherwise supported by, chassis 110. The drivetrain may be housed, in whole or in part, in any combination of the passenger compartment 104, the engine compartments 106 or elsewhere in the system 100. As part of the drivetrain, the system 100 may include wheels 114. The wheels 114 support the remainder of the system 100 on the ground. Using a modular fuel cell system (e.g., having a modular drive train), may facilitate accommodating different chassis of different sizes, shapes, and/or configurations. In the embodiments illustrated in FIG. 1, system 100 includes ten wheels 114, two of which are front wheels 114F, and eight of which are rear wheels 114R (however, in other embodiments there may be a different number of wheels). The rear wheels 114R may be arranged in four dual-wheel setups. The rear wheels 114R belonging to two driver's side dual-wheel setups are shown, with the other two, passenger side dual-wheel setups. The passenger side dual-wheel setups may be mirror images of the driver's side dual wheel setups. The passenger dual-wheel setups may include the remaining rear wheels 114R, which are not shown in FIG. 1. One, some, or all, of the wheels 114 may powered to drive system 100 along the ground. In rear-wheel drive embodiments, one, some, or all, of the rear wheels 114R may be powered to propel system 100 along the ground. For the purpose of propelling system 100, also as part of the drivetrain, in addition to the wheels 114, system 100 may include a combination of a transmission, a differential, and/or a drive shaft to which the wheels 114 may be mechanically connected. Optionally, drive train may be assembled/built by a different entity than the entity that builds/assembles the semi-trailer 102, compartment 104, body 108, chassis 110, hitch 112, and/or wheels 114.

System 100 operates as an assembly of interconnected items that equip the system 100 to satisfy real-time vehicle and/or system demands. A vehicle demand may correspond to a vehicle function whose performance satisfies the vehicle demand. Accordingly, the system 100 is equipped, in operation, to satisfy one or more vehicle demands by performing one or more corresponding vehicle functions. With respect to performing vehicle functions, system 100 is subject to any combination of manual operations and autonomous operations. For example, system 100 may be manual-only, semi-autonomous, highly autonomous, or fully autonomous.

System 100 may include one or more vehicle systems 120 for satisfying various vehicle demands. Any of vehicle systems 120 may be capable of performing vehicle functions on behalf of the system 100 (alone or in conjunction with the drivetrain), and thereby satisfying corresponding vehicle demands on behalf of the system 100. Any combination of vehicle systems 120 may be operable to perform a vehicle function.

In addition to vehicle systems 120, system 100 includes a sensor system 122, as well as processor system 124, memory system 126, and one or more control modules 128 (which, again, may be implemented as one control circuit or as a plurality of individual control circuits) to which the vehicle systems 120 and the sensor system 122 are communicatively connected ("control modules 128" is used to collectively refer to global control modules 128G and power control module 128P). Control modules 128 may determine the distribution the generation of power between the submodules of system 100 and/or between the main module and one or more submodules of system 100.

In this specification, the term "main" as in "main module" or "main system" differs from the submodules and/or parallel systems in that the main module or main system may send control signals to control parts of or all of the subsystems and/or submodules. In this specification, the term "parallel systems" is generic to both subsystems and the main system. However, the term "subsystem," is also intended to be generic to both the main system and the other subsystems, and thus when a plurality of "subsystems" is referred to without any indication of the existence of a main system, any of the subsystems may be a main system. In various embodiments "parallel systems" have high voltage systems that are electrically parallel to one another and/or mechanically parallel to one another, but parallel systems may share a common control system. In various embodiments parallel systems convert energy in a fuel and/or stored energy (e.g., in a battery) into mechanical energy that may be converted used for propelling a vehicle, optionally by turning a shaft that directly or indirectly causes the vehicle to travel. Optionally two parallel systems may turn the same shaft. Throughout this specification, the word "parallel" and the prefix "sub" and the prefix "main" may be substituted for one another to obtain different embodiments.

The sensor system 122 may be operable to detect information about the system 100. Sensor system 122 can include a plurality of sensors that can be used to detect various conditions internal or external to system 100, and provide information (e.g., sensor information, which may be information that is) indicative of, and/or characterizing the conditions that were sensed to processor system 124 and/or control modules 128.

In various embodiments, one or more of the sensors of sensor system 122 may include their own processing capability to compute the results for additional information that can be provided to control modules 128 (which may include electronic control units). In other embodiments, one or more sensors may be data-gathering-only sensors that provide only raw data to processor system 124 and/or control modules 128. In further embodiments, hybrid sensors may be included that provide a combination of raw data and processed data to control modules 128. Sensors of sensor system 122 may provide an analog output or a digital output.

Sensors of sensor system 122 may be included to detect not only vehicle conditions but also to detect external conditions as well. Sensor system 122 may be include sensors that might be used to detect external conditions, which may include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Processor system 124 may include one or more processors. Processor system 124, the memory system 126 and the control modules 128, together, may serve as one or more computing devices whose control modules 128 are employable to orchestrate the operation of system 100.

Specifically, control modules 128 may operate vehicle systems 120 based on information about the system 100. Accordingly, as a prerequisite to operating vehicle systems 120, the control modules 128 may gather information about system 100, including any combination of the information about the system 100 detected by sensor system 122 and/or information about the system 100 communicated between the control modules 128. Control modules 128 may then evaluate the information about the system 100, and control modules 128 may operate the vehicle systems 120 based on their evaluation. As part of the evaluation of the information about the system 100, the control modules 128 may identify one or more vehicle demands. When a vehicle demand is identified, the control modules 128 may operate one or more associated vehicle systems 120 to satisfy the vehicle demand.

The vehicle systems 120 may be part of, mounted to or otherwise supported by the chassis 110. The vehicle systems 120 may be housed, in whole or in part, in any combination of the passenger compartment 104, the engine compartments 106, or elsewhere in the system 100. Each vehicle system 120 may include one or more vehicle elements. Each vehicle element may operable to perform, in whole or in part, any combination of vehicle functions with which the vehicle system 120 is associated. It will be understood that the vehicle elements, as well as the vehicle systems 120 to which they belong, may be mutually distinct but need not be mutually distinct.

The vehicle systems 120 may include an energy supersystem 130 and a propulsion supersystem 132. The energy supersystem 130 and the propulsion supersystem 132 may be electrically connected to one another. The drivetrain may be mechanically connected to propulsion supersystem 132. The propulsion supersystem 132 and the drivetrain together serve as an electrified powertrain for system 100. The energy supersystem 130 may perform one or more energy functions, including but not limited to generating electrical energy. The propulsion supersystem 132 is operable to perform one or more propulsion functions using electrical energy from the energy supersystem 130, including but not limited to powering the wheels 114.

Specifically, the energy supersystem 130 may be operable to generate electrical energy, store electrical energy, condition electrical energy, and/or otherwise handle electrical energy, and store and otherwise handle fuel. In conjunction with the drivetrain, the propulsion supersystem 132 may be operable to power the wheels 114 using electrical energy from the energy supersystem 130. With the wheels 114 powered, the propulsion supersystem 132 may be used to accelerate system 100, maintain the speed of system 100 (e.g., on level or uphill ground) and otherwise drive the system 100 along the ground. The propulsion supersystem 132 may also generate electrical energy using one, some or all of wheels 114, and consequently retard wheels 114 to decelerate the system 100, maintain the speed of the system 100 (e.g., on a downhill surface or road) and otherwise drive the system 100 along the ground. The retarding of wheels 114 may be used for regenerative braking, and the energy from the regenerative braking, may be stored for later use.

In addition to the energy supersystem 130 and the propulsion supersystem 132, the vehicle systems 120 may include one or more auxiliary systems 134. The auxiliary systems 134 may include a braking system 140, a steering system 142, a heating/cooling system 144, and/or an accessory system 146. The auxiliary systems 134, such as the propulsion supersystem 132, are electrically connected to the energy supersystem 130. The auxiliary systems 134 are operable to perform one or more auxiliary functions using electrical energy from the energy supersystem 130, including, but not, limited to frictional braking the system 100, steering the system 100, cooling the system 100, heating the system 100, and/or one or more accessory functions. Accordingly, although the propulsion supersystem 132 acts as the principal electrical load on the energy supersystem 130, the auxiliary systems 134 may also place electrical loads on the energy supersystem 130 and on individual parallel system of energy supersystem 130, as well.

As part of sensor system 122, system 100 may include one or more onboard sensors. The sensors monitor the system 100 in real-time. The sensors, on behalf of the sensor system 122, may to detect information about the system 100, including information about user requests and information about the operation of the system 100.

Sensor system 122 may include sensors for detecting the level and/or usage of hydrogen, water, and/or other compounds used in fuel or powering system 100. Sensor system 122 may detect the amount of charge remaining in one or more batteries, and/or the capability of one or more batteries to hold a charge.

System 100 includes user controls, via which user requests are sent and/or sensed (e.g., a shift, accelerator, brakes, controls for climate control, mirrors, and/or lights). The user controls serve as interfaces between users of system 100 and the system 100 itself, and may receive mechanical, verbal, and/or other user inputs requesting vehicle functions. In conjunction with corresponding user controls, and among the sensors, the system 100 includes an accelerator pedal sensor, a brake pedal sensor, a steering angle sensor, a shift sensor, one or more selector sensors, one or more microphones, and/or one or more cameras, for example. Relatedly, among information about user requests, the sensor system 122 may be operable to detect user inputs requesting powering the wheels 114, user inputs requesting braking, steering, and/or switching gears, for example; user inputs requesting heating, and/or cooling, for example; and/or user inputs requesting accessory functions, for example.

Also among the sensors of sensor system 122, the system 100 may include one or more speedometers, one or more gyroscopes, one or more accelerometers, one or more wheel sensors, one or more thermometers, one or more inertial measurement units (IMUS), and/or one or more controller area network (CAN) sensors, for example. Among information about the operation of the system 100, sensor system 122 may detect the location and motion of the system 100, including the speed, acceleration, orientation, rotation, and/or direction of system 100, for example; the movement of the wheels 114, the temperatures of the system 100; and/or the operational statuses of one, some or all of the vehicle systems 120, the batteries, and/or the motors of system 100.

As noted above, the processor system 124, the memory system 126 and the control modules 128 together serve as one or more computing devices whose control modules 128 orchestrate the operation of system 100. The control modules 128 include a global control module 128G. Global control unit 128G may include an electric hybrid vehicle electronic control unit (EHV ECU).), which will be discussed below in conjunction with FIG. 5, below (which may be connected to EHV ECU 558d). As part of a central control system, system 100 may include a global control unit (GCU) to which the global control module 128G may belong. Global control unit 126B may apportion requests for power and/or torque between the parallel system of system 100 and/or between the main system of system 100 and one or more parallel systems of system 100 and determine how much power and/or torque each parallel system and/or the main system each should produce. The control modules 128 may also include one or more power control modules 128P. Relatedly, the system 100 includes one or more power control units (PCUs) to which the power control modules 128P belong. Although the processor system 124 and the memory system 126 are shown as being common to the GCU and the PCUs, any combination of, or all of, the GCU and the PCUs may be standalone computing devices with one or more dedicated processor system 124 and dedicated memory system 126.

The global control module 128G orchestrates the global operation of the system 100, including but not limited to the operation of the vehicle systems 120, on behalf of the GCU. The power control modules 128P orchestrate the operation of the energy supersystem 130 and the propulsion supersystem 132, as well as certain auxiliary systems 146, on behalf of the PCUs.

Control modules P may include circuitry to control various aspects of the vehicle operation. Control modules 128P may include, for example, a microcomputer that includes a one or more processing units (e.g., microprocessors), memory storage (e.g., RAM, ROM, etc.), and I/O devices. The processing units of control modules 128 may execute instructions stored in memory to control one or more electrical systems or parallel systems in the vehicle. Control modules 128 can include a plurality of electronic control units (ECUs), such as an electronic engine control module, a powertrain control module, a transmission control module, a suspension control module, and/or a body control module (for example). As a further example, electronic control units may be included for controlling systems and functions such as doors and door locking, lighting, human-machine interfaces, cruise control, telematics, braking systems (e.g., ABS or ESC), battery management systems, and so on. The various control units can be implemented using two or more separate electronic control units or using a single electronic control unit.

In the example illustrated in FIG. 1, sensor system 122 receives information from a plurality of sensors included in system 100. For example, control modules 128P may receive signals that indicate vehicle operating conditions or characteristics, or signals that can be used to derive vehicle operating conditions or characteristics. The signals may include, but are not limited to accelerator operation amount, $A_{CC}$, a rotational speed, $N_{MS}$, of the motor system 166 (motor rotational speed), and vehicle speed, $N_V$. These may also include brake operation amount/pressure, B, battery SOC (i.e., the charged amount for one or more batteries of battery system 162 detected by an SOC sensor).

The processor system 124 may be any components configured to execute any of the processes described herein or any form of instructions to carry out such processes or cause such processes to be performed. The processor system 124 may be implemented with one or more general purpose or special purpose processors. Examples of suitable processor system 124 include microprocessors, microcontrollers, digital signal processors or other forms of circuitry that execute software. Other examples of suitable processor system 124 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry and/or controllers. The processor system 124 may include at least one hardware circuit (e.g., an integrated circuit) configured to carry out instructions contained in program code. In arrangements where there are multiple parallel processor systems within processor system 124, the parallel systems of processor system 124 may work independently from each other or in combination with one another.

The memory system 126 is a non-transitory computer readable medium. The memory system 126 may include volatile or nonvolatile memory, or both. Examples of suitable memory system 126 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory system 126 includes stored instructions in program code. Such instructions are executable by the processor system 124 or the control modules 128. The memory system 126 may be part of the processor system 124 or the control modules 128, or memory system 126 may be communicatively connected the processor system 124 or the control modules 128.

Control modules 128 may control the electric drive components of the vehicle as well as other vehicle components. Control modules 128 may include machine instructions that may be executed by the processor system 124. The control modules 128 may be implemented as computer readable program code that, when executed by the processor system 124, execute one or more of the processes described herein. Such computer readable program code may be stored on the memory system 126. The control modules 128 may be part of the processor system 124 or may be communicatively connected the processor system 124.

As part of the vehicle systems 120 performing vehicle functions on behalf of the system 100 (to satisfy corresponding vehicle demands on behalf of the system 100), the energy supersystem 130 may perform energy functions (e.g., functions that involve generating and/or consuming energy), and thereby satisfy corresponding energy demands, the propulsion supersystem 132 is operable to perform propulsion functions, and thereby satisfy corresponding propulsion demands, and the auxiliary systems 134 are operable to perform auxiliary functions, and thereby satisfy corresponding auxiliary demands.

From the perspective of the global control module 128G and the power control modules 128P, and the orchestration of the global operation of the system 100, the vehicle demands include one or more global vehicle demands or, in other words, vehicle demands common to the system 100. Specifically, one or more of the energy demands may be global energy demands, and one or more of the propulsion demands may be global propulsion demands. The global energy demands may include any combination of one or more demands to generate electrical energy, one or more demands to store electrical energy, and one or more demands to store and otherwise handle fuel. The global propulsion demands may include one or more demands to power the wheels 114 and one or more demands to retard the wheels 114. Any combination of the global energy demands, and the global propulsion demands, may be part of global combined energy and propulsion demands, such as one or more demands to regeneratively brake the system 100. Any auxiliary demand may be a global auxiliary demand. The global auxiliary demands may include any combination of one or more demands to frictionally break the system 100, one or more demands to steer the system 100, one or more demands to cool the system 100, one or more demands to heat the system 100 and one or more demands to perform accessory functions.

Beyond being equipped to satisfy the global vehicle demands by performing corresponding vehicle functions, the system 100 may be equipped to satisfy one or more vehicle demand requirements. Specifically, in relation to being operable to perform vehicle functions, and thereby satisfy corresponding global vehicle demands, the vehicle systems 120 have the capacity to satisfy vehicle demand requirements on behalf of the system 100. Accordingly, the energy supersystem 130 has the capacity to satisfy certain energy demand requirements, the propulsion supersystem 132 has the capacity to satisfy certain propulsion demand requirements, and the auxiliary systems 134 have the capacity to satisfy certain auxiliary demand requirements.

Vehicle demand requirements are specific to particular vehicle applications or vocations. In this specification a "vocation" refers to a specific end use and/or product made by the entire process or by the second entity or last entity (e.g., the OEM). For example, one vocation may be a beer truck (which may require refrigeration), another vocation may be a garbage truck, whereas another vocation may be passenger bus. For example, the system 100, as a semi-tractor application, has higher energy demand requirements and higher propulsion demand requirements than many other vehicle applications. In some cases, one vocation of system 100 may have multiple times the energy demand requirements and multiple times the propulsion demand requirements of another vocation.

For purposes of realizing the capacity to satisfy the energy demand requirements and the capacity to satisfy the propulsion demand requirements, the system 100 includes multiple power module main system 150A and subsystems 150B (referenced generally using "power modules 150" or "power module systems 150") whose vehicle elements are may be mechanically linked. In various embodiments, each power modules 150 is electrically isolated from other power module systems. Although the system 100, as shown, includes two power modules 150A and 15B, in other embodiments, more than two power modules 150 may be included. In relation to the power modules 150, the energy supersystem 130 includes multiple main energy system 152A and sub energy systems 152B (collectively energy systems 152) that may each have a corresponding main propulsion system 154A and sub propulsion system B (referred to collectively propulsion systems 154) in propulsion supersystem 132.

In each power module 150, the propulsion system 154 and the energy system 152 may be electrically connected to one another. Moreover, the drivetrain is mechanically connected to each propulsion system 154. Each energy system 152 may perform energy functions with which the energy supersystem 130 may be associated (e.g., on behalf of propulsion systems 154), including but not limited to generating electrical energy. Similarly, each of propulsion system 154 may perform propulsion functions (e.g., the power module 150 to which it belongs and) with which the propulsion supersystem 132 is associated using electrical energy, including but not limited to powering the wheels 114. Each propulsion system 154 is, specifically, operable to perform propulsion functions using electrical energy from the energy system 152 of the power module 150 to which it and the energy system 152 belong.

Each energy system 152, and the power module 150 to which it belongs, may include a main fuel system A and one sub fuel system B (referred to collectively as fuel cell system 160), a main battery system 162A and sub battery 162B (referred to collectively battery system 162), and/or a main fuel tank system 164A and sub fuel tank system 164B (referred to collectively as fuel tank system 164) and sub fuel tank system 164B (referred to collectively as fuel tank system 164). Each propulsion system 154, and the power module 150 to which it belongs, may include a motor system 166. Inside each power module 150, the motor system 166 is electrically connected to the corresponding fuel cell system 160, so as to power the motor system 166. The battery system 162 and the corresponding fuel cell system 160 may be electrically connected to one another, so that the fuel system 160 may recharge battery system 162, and both may power the corresponding and the motor system 166. Additionally, battery system 162 may provide transient power demands, so that the corresponding a relatively constant power draw from the corresponding fuel system 160 while the fuel corresponding fuel system 160 is used for powering the corresponding motor system 166.

The motor(s) of motor systems 166 can be powered by the battery (or batteries) of battery systems 162 to generate a motive force to move the system 100 and adjust vehicle speed. The motor(s) of motor systems 166 can also function as a generator to generate electrical power such as, for example, when coasting or braking. Battery systems 162 may also be used to power other electrical or electronic systems in the vehicle. A given battery system 162 may have different power demands than other battery systems 162 as a result of powering a different set of other electrical systems (e.g., it may be that one or more battery systems 162 do not power any other electrical systems and/or that only one of battery systems 162 powers all of the other accessory and/or auxiliary electrical systems). A given motor one of motor systems 166 may be connected to a given battery of battery systems 162, via an inverter. The batteries of battery systems 162 may include, for example, one or more batteries, capacitive storage units, or other storage reservoirs suitable for storing electrical energy that can be used to power an electric power motor. The batteries of battery systems 162 may be implemented using one or more batteries, the batteries can include, for example, nickel metal hydride batteries, lithium ion batteries, lead acid batteries, nickel cadmium batteries, lithium ion polymer batteries, and/or other types of batteries.

Control modules 128 may control an inverter to adjust driving current supplied to one or more motors of motor system 166, and adjust the current received from the motor during regenerative coasting and breaking. As a more particular example, output torque of the motor can be increased or decreased by control modules 128 through the inverter.

Fuel cell systems 160 are fluidly connected to fuel tank systems 164. Fuel cell systems 160 may generate electrical energy using energy from the fuel from fuel tank system 164. In conjunction with the drivetrain, motor systems 166 power the wheels 114 using electrical energy from any combination of fuel cell systems 160 and battery systems 162.

Battery systems 162 may be provided by a first subentity (e.g., a first subentity of a manufacturer) may be provided to a second subentity (e.g., a second subentity of a manufacturer), which adds fuel cell systems 160 and fuel tank systems 164 to battery systems 162 to form a kit that is provided to a second entity (e.g., an OEM). Control modules 128 may be communicatively connected to fuel systems 160, battery systems 162, fuel tank system 164, motor systems 166, and/or other part so system 100 by the modular harness.

The motor systems 166 may also generate electrical energy using the wheels 114, and consequently retard wheels 114. Battery system 162 may store electrical energy from the corresponding fuel cell system 160. Battery system 162 may store electrical energy from the corresponding motor system 166. Fuel tank system 164 is operable to store and otherwise handle fuel, including fueling the corresponding fuel cell system 160 with fuel. The power modules 150 may be "stacked" for purposes of realizing the capacity to satisfy the energy demand requirements and the capacity to satisfy the propulsion demand requirements of the system 100 to which they belong. Specifically, given an energy demand requirement, in each power module 150, the energy system 152 has the capacity to satisfy a share of the energy demand requirement. Power modules 150 to which the energy systems 152 belong have the capacity to in combination satisfy the energy demand requirement, with the contribution of each energy system being added together to fulfill the energy requirement of system 100. In various embodiments, the energy supersystem 130 has the capacity to satisfy the energy demand requirement of system 100 as well based on the contribution of each energy system 152. Similarly, given a propulsion demand requirement, in each power module 150, the propulsion system 154 has the capacity to satisfy a share of the propulsion demand requirement of system 100. With the propulsion systems 154 each having the capacity to satisfy a share of the propulsion demand requirement, power modules 150 to which the propulsion systems 154 belong have the capacity to contributorily satisfy the propulsion demand requirement. With the propulsion systems 154 likewise belonging to the propulsion supersystem 132, the propulsion supersystem 132 has the capacity to satisfy the propulsion demand requirement as well. In an embodiment, one or more of energy systems 152 may be able to power system 100 alone, for at least short duration of time and optionally on a continuous, ongoing, and/or long-term basis.

Given a global energy demand, in each power module 150, the energy system 152 may be operable to satisfy a share of the global energy demand. With the energy systems 152 each operable to satisfy a share of the global energy demand, the power modules 150 to which the energy systems 152 belong may be operable to contributorily satisfy the global energy demand. With the energy systems 152 likewise belonging to the energy supersystem 130, the energy supersystem 130 is operable to satisfy the global energy demand as well. Similarly, given a global propulsion demand, in each power module 150, the propulsion system 154 may be operable to satisfy a share of the global propulsion demand. With the propulsion systems 154 each operable to satisfy a share of the global propulsion demand, the power modules 150 to which the propulsion systems 154 belong are operable to contributorily satisfy the global propulsion demand. With the propulsion systems 154 likewise belonging to the propulsion supersystem 132, the propulsion supersystem 132 is operable to satisfy the global propulsion demand as well.

Although vehicle demand requirements are specific to particular vehicle applications, some vehicle demand requirements are less vocation-dependent than others, and a semi-tractor vocation (for example), may still have similar auxiliary demand requirements as many other vehicle vocations.

In various embodiment system 100, the auxiliary systems 134 perform functions that are common to the system 100, rather than having multiple system relationships, In relation to the power modules 150 and the energy supersystem 130, one or more of the auxiliary elements, either individually or as part of the auxiliary systems 134 to which they belong, are assigned to the power modules 150. At each power module 150, each assigned auxiliary element, either individually or as part of the auxiliary system 134 to which it belongs, as the case may be, is electrically connected to at least one of the energy systems 152. On behalf of the system 100 and the auxiliary system 134 to which a given one of power modules 150 belongs, each assigned auxiliary element is operable to perform auxiliary functions using electrical energy from at least one of the energy systems 152. Accordingly, in each power module 150, although the propulsion system 154 acts as the principal electrical load on the energy system 152, the assigned auxiliary elements act as electrical loads on the energy system 152 as well. However, given a global auxiliary demand, the assigned auxiliary elements are operable to satisfy the global auxiliary demand on an unassigned basis.

As noted above, the power control modules 128P orchestrate the operation of the energy supersystem 130 and the propulsion supersystem 132, as well as certain auxiliary systems 146. Power control modules 128P is used to collectively refer to main control module 128P-A and subcontrol module 128P-B. Power control module 128P Specifically, in relation to the arrangement of the energy supersystem 130 and the propulsion supersystem 132 across the power modules 150, the system 100 includes multiple system power control modules 128P (e.g., parallel power control modules 128P-A and 128P-B). In the system 100, each power control module 128P is assigned a power module 150. With each power module 150 including an energy system 152 and a propulsion system 154, each power control module 128P is assigned an energy system 152 and a propulsion system 154. Moreover, one or more power control module 128P may also be assigned control over auxiliary elements. Specifically, one or more power control module 128P may be assigned the auxiliary elements assigned to the power module 150 that, in turn, may be assigned to the power control module 128. Each power control module 128 orchestrates the operation of the assigned power module 150, including the operation of the assigned energy system 152 and the operation of the assigned propulsion system 154, as well as the operation of the assigned auxiliary elements.

To facilitate modularization, each power module 150 may be sourced from another vehicle application, such as a passenger car application, with lower energy demand requirements and lower propulsion demand requirements than the system 100. Specifically, each power module 150 may be a modularized version of a complete energy system and a complete propulsion system from other vehicle application. Relatedly, each power control module 128P may be sourced from the other vehicle application as well. Specifically, each power control module 128P belongs to a PCU sourced from the other vehicle application as a standalone computing device with one or more dedicated processors and dedicated memory, in addition to the power control module 128P itself.

In an embodiment, any combination of the fuel cell system 160, the battery system 162 and the fuel tank system 164 of one power module 150 could have the same capacity to satisfy energy demand requirements as their parallel systems of the remaining power modules 150. Additionally, or alternatively, the motor systems 166 of one power modules 150 could have the same capacity to satisfy propulsion demand requirements as its parallel system of the remaining power modules 150.

Beyond the specific embodiments illustrated in FIG. 1, across a broader vehicle lineup, for new vehicle applications, multiple of the same or similar power modules 150 could be stacked for purposes of realizing the capacity to satisfy the energy demand requirements and the capacity to satisfy the propulsion demand requirements of the new vehicle applications. One or more vehicle elements of the power modules 150 could be standardized across the vehicle lineup. For instance, in every power module 150, the fuel cell system 160 could be the same. Additionally, or alternatively, one or more of the power control modules 128P could be the same. With the standardized vehicle elements having the same capacity to satisfy vehicle demand requirements regardless of the vehicle demand requirements of the new vehicle applications, only singular, single-capacity standardized vehicle elements need to be and produced, and new or different demand requirements can be accommodated by changing the number of vehicle elements that are stacked to meet a particular demand.

Since the modules are easily integrated into new vehicle applications, the power modules 150 are useful beyond initial vehicle development and production. For instance, in an end-of-life (EOL) scenario for the system 100, a power module 150 may no longer have the capacity to contributorily satisfy the energy demand requirements of the system 100. Additionally, or alternatively, the power module 150 may no longer have the capacity to contributorily satisfy the propulsion demand requirements of the system 100. The power module 150 may nonetheless have the capacity to contributorily satisfy the energy demand requirements and the capacity to contributorily satisfy the propulsion demand requirements of another vehicle application. Accordingly, instead of disposing of the power module 150, it could be integrated into the other vehicle application. Similarly, if a OEM changes their specifications for a vehicle (e.g., changes the size of the chassis, the type of fuel cell, the number of power systems, parts only need to be removed from, added to, and/or swapped with the original configuration to arrive at the new configuration).

In an embodiment, the power generation system, which is the fuel cell system 160, the hydrogen storage system of the fuel tank system 164 (which may be the fuel tank system 164 in an all hydrogen fuel cell-hybrid electric vehicle), optionally a harness, the battery system 162 (or at least the high voltage battery system of the battery system 162), are supplied by the manufacturer (e.g., as a kit), and the auxiliary systems 134 are supplied by the OEM (the manufacturer being a first subentity). In this specification, the term "high voltage" refers to voltages that are appropriate for driving motors that turn a shaft for propelling or driving system 100. For example, in an embodiment, a high voltage battery system may have a 650 Volt voltage drop (in other embodiments other voltages may be used, such as 1200 volts). Similarly, low voltage refers to a voltage that is appropriate for running accessories of system 100, such as lights (e.g., 12 volts). In an embodiment, the OEM is responsible for mechanical connections. In an embodiment, the OEM (a first subentity) has an option as to whether to purchase motor system 166 (and or other components) from the manufacturer.

In other embodiments, the breakdown between which parts are provided by different entities, subentities, and/or the manufacturer and which parts are provided by the OEM may be different. In an embodiment, the fuel cells are provided by one entity of the manufacturer (or a first manufacturer or a first subentity of the first entity), whereas the high voltage battery, hydrogen storage, and the optional motor-transmission system is provided by another entity of the manufacturer (or a second manufacturer or a second subentity of the first entity). In other embodiments there may be more than just 2 entities and/or fewer or more than two subentities (e.g., there may be multiple OEMs, multiple entities within any given OEM, multiple manufacturers and/or multiple entities with any given manufacturer).

Figure 2:
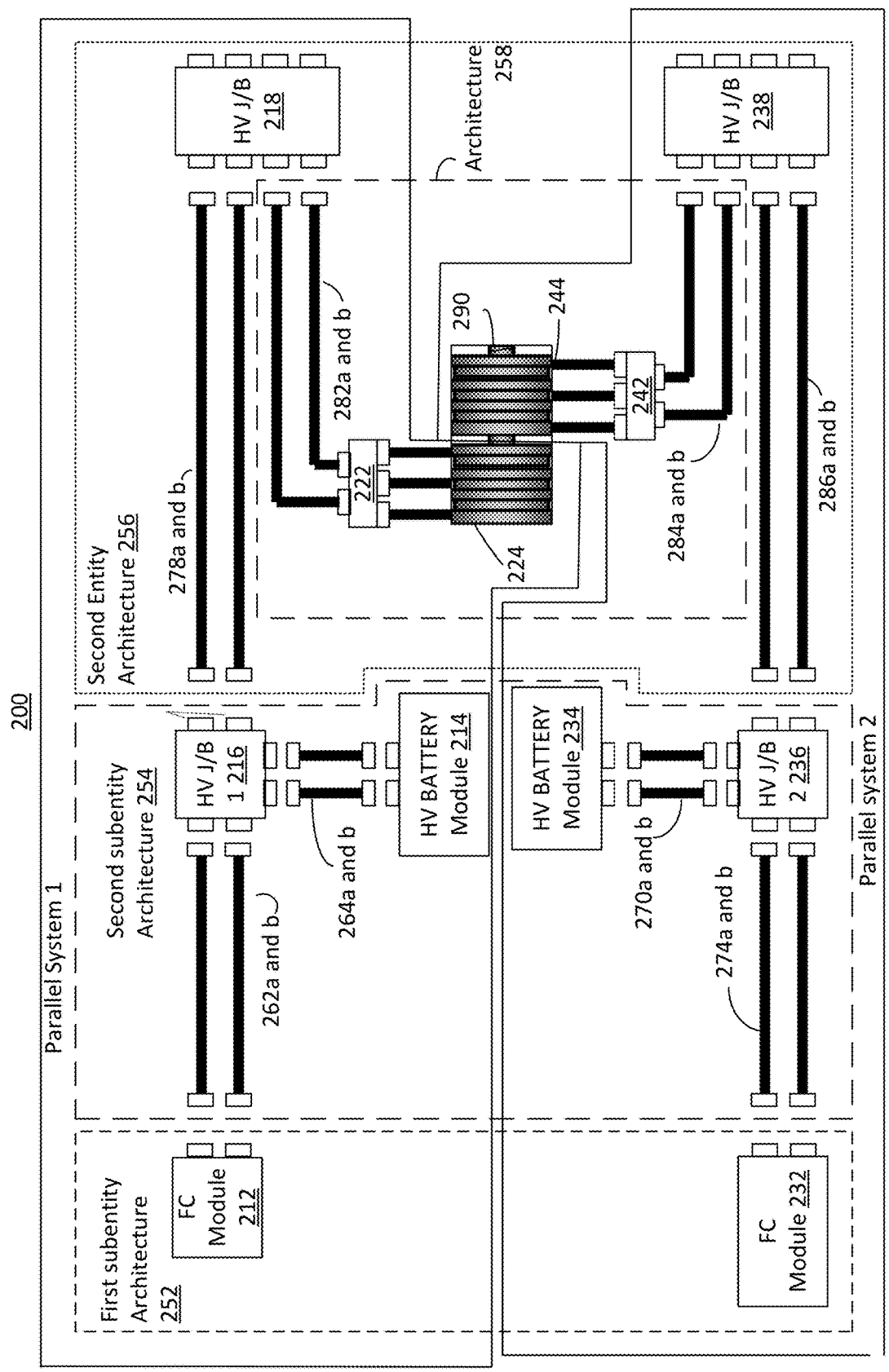
FIG. 2 illustrates various embodiments of a high voltage system, which may be used in the system of FIG. 1.

FIG. 2 is a diagram illustrating a high voltage system 200. FIG. 2 illustrates which parts of high voltage system 200 are provided by first subentity of the first entity, second subentity of the first entity, and the second entity (in the example of FIG. 2, the first subentity of the first entity and the second subentity of the first entity together form the first entity). High voltage system 200 is an example modular fuel cell powertrain architecture for a fuel cell vehicle, which allows for mass production for a wide array of OEM vocations. High voltage system 200 is an embodiment of how portions of control modules 128A and B, fuel cell systems 160A and B, battery systems 162 A and B, motor systems 166A and B, and may be connected together into separate, but parallel systems. More specifically, the modular fuel cell system architecture of high voltage system 200 allows the second entity (e.g., an OEM) to add or subtract fuel cell modules from the fuel cell vehicle's powertrain system with minimal modification to system architecture provided by the first entity.

In the example of FIG. 2, modular fuel cell powertrain architecture of system 200 contains two parallel systems, system 1 and parallel system 2. Either of parallel systems 1 or 2 may be the main system. Parallel system 1 may include fuel cell (FC) module 212, high voltage (HV) battery module 214, power generation side high voltage junction box 216, power consumption side high voltage junction boxes (HV J/B) 218, electrical inverter 222, and electric motor 224. Parallel system 2 may include fuel cell module 232, high voltage battery module 234, power generation side high voltage junction box (HV J/B) 236, electrical inverter 242, and/or electric motor 244.

Fuel cell modules 212 and 232 may be part of fuel cell system 160. Fuel cell module 232 may be a of different type than fuel cell module 212. For example, one fuel cell module may have a polymer electrolyte membrane (PEM) fuel cell and the other fuel cell may have fuel cells that are direct methanol fuel cells. High voltage battery modules 214 and 234 may be part of battery system 162. Electrical inverter 222, electric motor 224, inverter 242, and electric motor 244 may be part of motor system 166. However, fuel cell module 212, high voltage battery module 214, electrical inverter 222, electric motor 224 are part of main energy module 152A, whereas fuel cell module 232, high voltage battery modules 234, inverter 242, and electric motor 244 may be part of sub energy module 152B. Power distribution system 220 and power distribution system 240 may be part of power control module 128 A and B, respectively.

The high voltage portions of parallel systems 1 and 2 may be electrically isolated from one another (but parallel systems 1 and 2 may share a common control system). For example, fuel cell module 212, high voltage battery module 214, power generation side high voltage junction box 218, may be electrically isolated from fuel cell module 232, high voltage battery module 234, power generation side high voltage junction box 238, power consumption side high voltage junction box 238. Parallel systems 1 and 2 may independently power their respective motors 224 and 234, which in turn may turn drive shaft 290. Although in the examples of FIG. 2 and rest of the specification may illustrate only two parallel systems, as an example, there may be any number of parallel systems. In an embodiment, each parallel system is kept electrically isolated from the other parallel systems.

Driving force power generated by the fuel cell module 212 and/or high voltage battery module 214 may be transmitted to motor 224, which in turn is transmitted to one or more wheels. Optionally, the power is transmitted to the wheels, via a transmission, a differential gear device, and a pair of axles.

In accordance with various embodiments, fuel cell modules 212 and 232 may be used to provide motive power during driving, electrical power to various vehicle accessories (e.g. vehicle lights), and/or in some cases/modes of operation, fuel cell modules 212 and 232 may be responsible for charging high voltage battery modules 214 and 234, respectively.

In various embodiments, the high voltage battery modules 214 and 234 may assist fuel cell modules 212 and 232, respectively, during vehicle start up and acceleration. In particular, high voltage battery modules 212 and/or 232 may be used to power system 100 during transient loads. When a fuel cell is subject to transient loads, the transient load may cause plating of the membranes of the fuel cell. In one embodiment, control logic is provided to change whether the fuel cell modules 212 and 232 provide power directly to the motors 222 and 242, respectively. Thus, for example, during a transient power demand (e.g., during acceleration or startup), fuel cell modules 212 and 232 may provide power to high voltage battery modules 214 and 234, and high voltage battery modules 214 and 234 may then power the motor 222 and 242, respectively, whereas while cruising at a constant velocity on level ground (for example), fuel cell modules 212 and 232 may provide power to the motors 222 and 242, directly, and optionally to the high voltage battery modules 214 and 234 (so that high voltage battery modules 214 and 234 can essentially always provide a relatively constant amount of power and does not need to meet a transient power demand). In an alternative embodiment, fuel cell modules 212 and 232 may never directly power the motors 222 and 232, but fuel cell modules 212 and 232 may provide power to high voltage battery modules 214 and 234, which in-turn power the motors 222 and 232, respectively.

In the illustrated example embodiment of FIG. 2, each parallel system includes two sources of electrical power generation (e.g., for sub system 1, fuel cell module 212 and high voltage battery module 214 and fuel cell module 212) that may be configurable (e.g., via relays) to be connected in parallel at some times and in series at other times. Although in FIG. 2, the fuel cells electric power is used for driving the motors of vehicles, in other embodiments, other sources of electrical power may be used instead and/or other types of systems may be powered.

Parallel systems 1 and 2 may independently power their respective motors 224 and 244, which both in-turn may turn drive shaft 290.

Junction boxes 216 and 236 separate the architecture of high voltage system 200 into a portion that is supplied by the first entity and a portion that is provided by the second entity. By separating the high voltage system 200, via junction boxes 216 and 236, the first entity (e.g., the manufacturer)

can ship the portion created by the first entity to the second entity, with junction boxes 218 and 238 connected to the first entity's side (e.g., the manufacturer's side) of the architecture of high voltage system 200, and the second entity (e.g. the OEM) only needs to plug electrical components of the second entity (e.g., the OEM) portion of high voltage system 200 into junction boxes 218 and 238 to communicate power and data between the side of the first entity (e.g., the manufacturer's side) of the architecture of high voltage system 200 and the second system (e.g., OEM) side of the architecture of high voltage system 200. In addition, parallel systems 1 and/or 2 may be utilized to power various vehicle accessories (e.g., vehicle lights, power take offs, etc.), connected to the second entity (e.g., OEM) side high voltage junction boxes 218 and 238. High voltage junction boxes 218 and 238 may be used by the second entity (e.g., OEM) as a power source for powering accessories. If the second entity (e.g., OEM) needs a low voltage, the second entity (e.g., OEM) may step down the voltage, (e.g., using a buck converter). By providing a high voltage source to the second entity (e.g., via high voltage junction boxes 216 and 236), the second entity (e.g., OEM) is given more flexibility in terms of voltage and current that are available to the second entity (e.g., OEM) for meeting various vocations (whereas if a low voltage source were provided, the second entity (e.g., OEM) might not be able to get as many combinations of both combinations of both high current and high voltages).

Inverters 222 and 242 are capable of conditioning electrical energy from fuel cell modules 212 and 232, respectively. Inverters 222 and 242 are capable of conditioning electrical energy from high voltage battery modules 214 and 234. Specifically, inverter 222 may convert DC electrical energy from the fuel cell module 212 and/or high voltage battery module 214 into AC electrical energy, which may be high voltage electrical energy. Inverter 242 may convert DC electrical energy from the fuel cell module 232 and/or high voltage battery module 234 into AC electrical energy, which may be high voltage electrical energy.

The first subentity architecture 252 may be produced by the first subentity (e.g., the first subentity of manufacturer 1), which may include fuel cell module 212, and fuel cell module 232. The second subentity architecture 254 may be produced by the second subentity of the first entity (e.g., the second subentity or the manufacturer or Manufacturer 2), which further may include high voltage junction box 216. High voltage junction box 216 attaches, via lines 262 a and b to fuel cell module 212, and, via lines 264a and b, to high voltage battery module 214. In this specification, each "line" may include multiple electrical connections (e.g., wires) that have different purposes, which are used to transmit power, control signals, and/or data between the module for which the line is adapted for and other parts of the system. High voltage junction box 216 may also connect to high voltage junction box 230. Similarly, high voltage junction box 236 attaches, via lines 274 a and b to fuel cell module 232 (which may be a stack of fuel cells) of and, via lines 270a and b, to high voltage battery module 234. High voltage junction box 236 may also connect to high voltage junction box 238. For the sake of keeping high voltage system 200 modular, high voltage junction boxes 216 and 236 may only have a limited number of connections, which may only be adequate for connecting one or two devices or another junction box (e.g., junction boxes 218 and 238). Lines 278 and b and 286 and b connect junction boxes 216 and 236 to junction boxes 218 and 238, there by power junction boxes 218 and 238, respectively. Lines 282a and b and lines 284a and b bring power form junction boxes 218 and 238 to motors 224 and 244, respectively thereby transmitting power between motors 224 and 244 and first subentity architecture 252 and second subentity architecture 254.

By using junction boxes 218 and 238 to split the voltage from junction boxes 216 and 236, first subentity architecture 252 and second subentity architecture 254 can be used for a variety of different vocations. The first subentity and first subentity do not need to know what vocation first subentity architecture 252 and/or second subentity architecture 254 will be used for, and only the second entity needs to be concerned with the details of the junction box needed to support the vocation determined by the second entity.

The second entity (e.g., OEM) may use high voltage junction boxes 218 and 238 to connect the second entity architecture 256 to the second subentity architecture 254 (and thereby to the combination of the first subentity architecture 252 and second subentity architecture 254, so that FC modules 212 and 232 and/or HV batter modules 214 and 234 may send power to inverters 222 and 243, respectively). High voltage junction boxes 218 and 238 may be used to connect inverters 222 and 242, respectively, which in turn connect to motors 224 and 244, respectively, which in turn connect to motors 224 and 244 (which turn a shaft). Inverters 222 and 242 and motors 224 and 244 form architecture 258.

Architecture 258 is a portion of the system that the second entity has an option to receive from the first subentity and/or the entity formed by the combination of the first subentity and/or first subentity, or instead may be supplied by the second entity (the OEM). High voltage junction boxes 218 and 238 may also connect to, and power, auxiliary systems 134. Optionally, high voltage junction boxes 216 and 218 may be combined into one junction box and high voltage junction boxes 236 and 238 may be combined into one junction box.

Figure 3B:
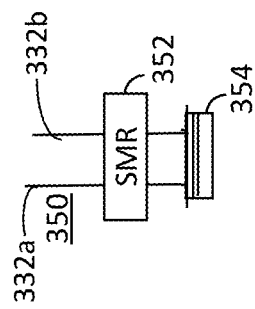
FIG. 3B illustrates a high voltage system that may be used in the high voltage battery system of FIG. 2.
Figure 3A:
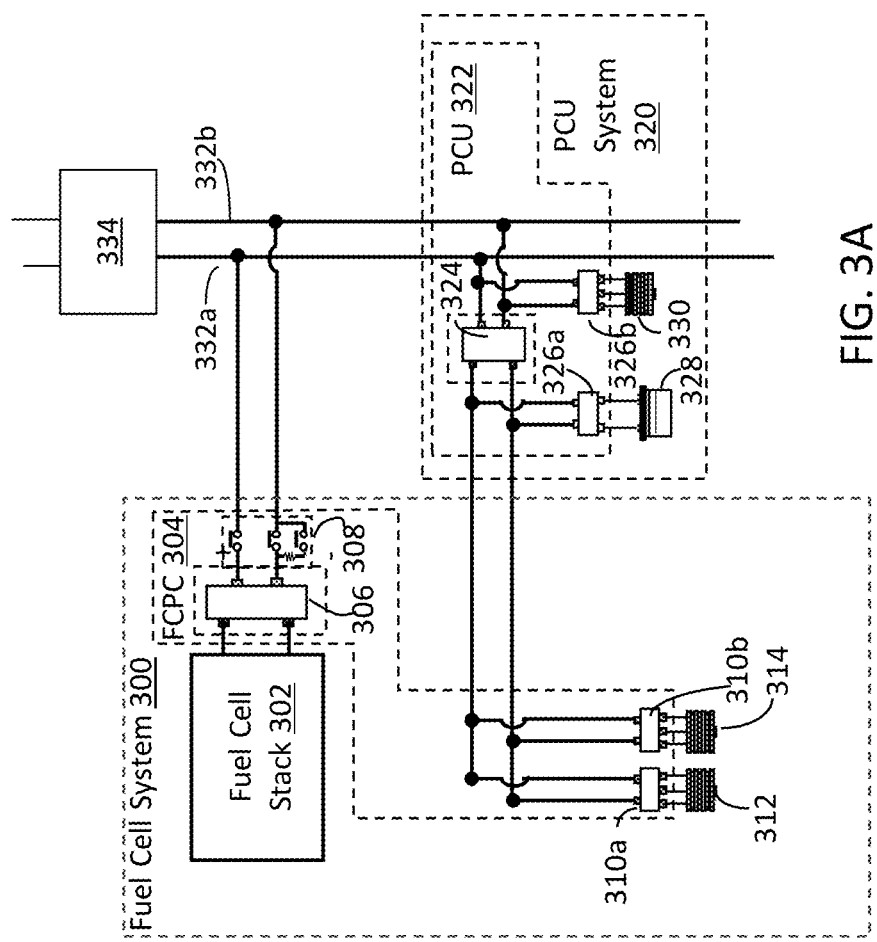
FIG. 3A illustrates various embodiments of a combination of fuel cell system and power control system that may be used together or separately within the high voltage system of in FIG. 2.

FIG. 3A illustrates various embodiments of fuel cell system 300 and power control unit (PCU) system 320. Fuel cell module 212 and/or 232 may both individually include different copies of fuel cell system 300 and PCU system 320. Fuel cell system 300 may include fuel cell stack 302 and fuel cell power control (FCPC) 304. FCPC 304 may include FC boost converter 306, FC relay 308, converter 310a and b, hydrogen pump 312 and water pump 314. Power control unit (PCU) system 320 may include PCU 322, buck converter 324, DCDC converters 326a and b, low voltage battery 328, compressor 330, and lines 332a and b, and/or power distribution system 334.

Fuel cell system 300 may be an embodiment of fuel control system 216 and/or fuel control system 236. Fuel cell stack 302 is a stack of one or more fuel cells, which individually contribute power to turning shaft 290 (FIG. 2), recharging battery systems 214 and 234, powering accessory system 134, and/or powering accessory system 146. FCPC 304 controls how much power is provided by fuel stack 302, and/or whether the power is used powering the one motor 224 or 244 to which fuel stack 302 is connected, and/or for recharging the one of battery module 214 or 234 to which fuel stack 302 is connected. Boost converter 306 increases the voltage output by fuel cell stack 302, so that fewer cells are needed to power the vehicle. FC relay 308 controls whether or not the fuel cell stack 302 is connected to the power lines for powering the electric motor and/or for charging the batteries (e.g., high voltage battery modules). DCDC converter 310a and b convert the voltage from PCU 320 of PCU system 320 to a voltage needed for hydrogen pump 312 and water pump 314, respectively. Hydrogen pump 312 provides hydrogen to fuel cell stack 302, which is used for producing power. Water pump 314 may pump water to cool fuel cell stack 302. FCPC 304, PCU system 320, and PCU 322 may be part of main control module 128A, and/or subcontrol module 128B.

Buck converter 324 is connected to the power lines, drawing power from the high voltage battery module 214 or 232, and buck converter 328 reduces the voltage from the high voltage battery module 214 or 232 and/or fuel cell stack 302 to a lower voltage. The power from buck converter 324 is applied to DCDC converters 310 a and b, and/or 326a, for powering the hydrogen pump 312, powering water pump 314, and/or for charging low voltage battery 328. DCDC converter 326b may convert voltage from the high voltage battery module 214 or 232 and/or from fuel stack 302 to a lower voltage for running air compressor 330. Air compressor 330 pumps air to fuel cell stack 302, which uses the oxygen in the air as fuel, by combining the oxygen with hydrogen (supplied by hydrogen pump 312) to create water, and thereby releasing energy as part of the reaction that creates the water that is pumped, and thereby removed, by water pump 314. Lines 332 a and b connect to fuel cell system 300, via relay box 308, and to PCU 322, via buck converter 324, and DCDC converter 326b. Lines 332 a and b carry power from fuel cell stack to the motors 224 or 244, hydrogen pump 312, water pump 314, low voltage battery 328, and/or air compressor 330. Lines 332 a and b may include lines 262 a and b, 264 a and b, 270 and b, 274 and b, 278 a and b, 282 and b, 284 a and b and/or 286 and b.

Power distribution system 334 may be connected to both parallel system 1 and 2 (and any other parallel systems), and may send control signals to relay box 308 to determine when fuel cell stack 302 is connected to the rest of system 100, powers motor 224 or 244, and/or charge battery system 214 or 234. Power distribution system 334 may determine the contribution of each of parallel systems 1 and 2 to the total power and/or total torque. Power distribution system 334 may be part of global control module 128G.

FIG. 3B illustrates high voltage battery system 350, which may include system main relay (SMR) 352 and high voltage battery 354. Fuel cell module 212 and/or 232 may both individually include a copy of high voltage battery system 350. SMR 352 connects and disconnects high voltage battery 354. Battery system 350 may be part of the same parallel system as fuel cell system 300. SMR 352 may connect high voltage battery system, via lines 332 and b, to motor 222 or 242. During acceleration and/or deceleration (and/or at other times), high voltage battery 354 may assist fuel cell stack 302 in powering, via lines 332 and b, motor 222 or 242. During regenerative breaking, SMR 352 may keep high voltage battery 354 connected, via lines 332 and b, to the power lines for charging high voltage battery 354. Power distribution system 334 may determine the contribution of battery system 350 and of the contribution of fuel cell stack 302 to the power provided by the system of FIGS. 3A and B to motor 224 or 244.

Figure 4:
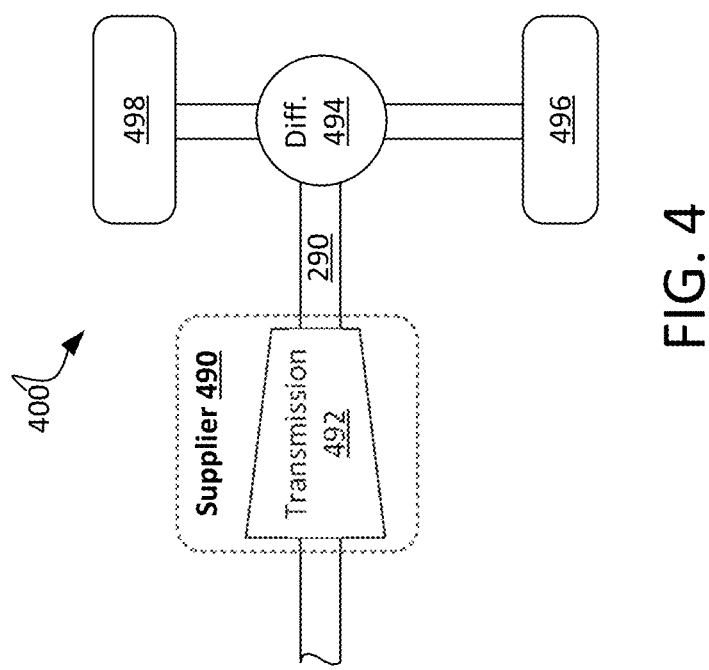
FIG. 4 illustrates various embodiment of a drivetrain system that may be used with the high voltage system of FIG. 2.

FIG. 4 illustrates system 400, which may include part provided by a supplier 490, which may include transmission 492. System 400 may also include differential 494, and wheels 496 and 498 (which may be provided by the second entity). Supplier 490 may be either the first entity (e.g., the second subentity of the first entity) or the second entity. Transmission 492 provides the control over the rotational speed of shaft 290 and determines the transfer of the torque to shaft 290, which interacts with the differential 494, which in-turn turns the wheels 496 and 498. Transmission 492 and differential 494 may be attached to shaft 290 (see FIG. 2). Differential 494 allows wheels 496 and 498 to turn at different rates, when needed, such as when turning. Wheels 496 and 498 may be an embodiment of any of wheels 114 (see FIG. 1).

Overview of Low Voltage System

Figure 5:
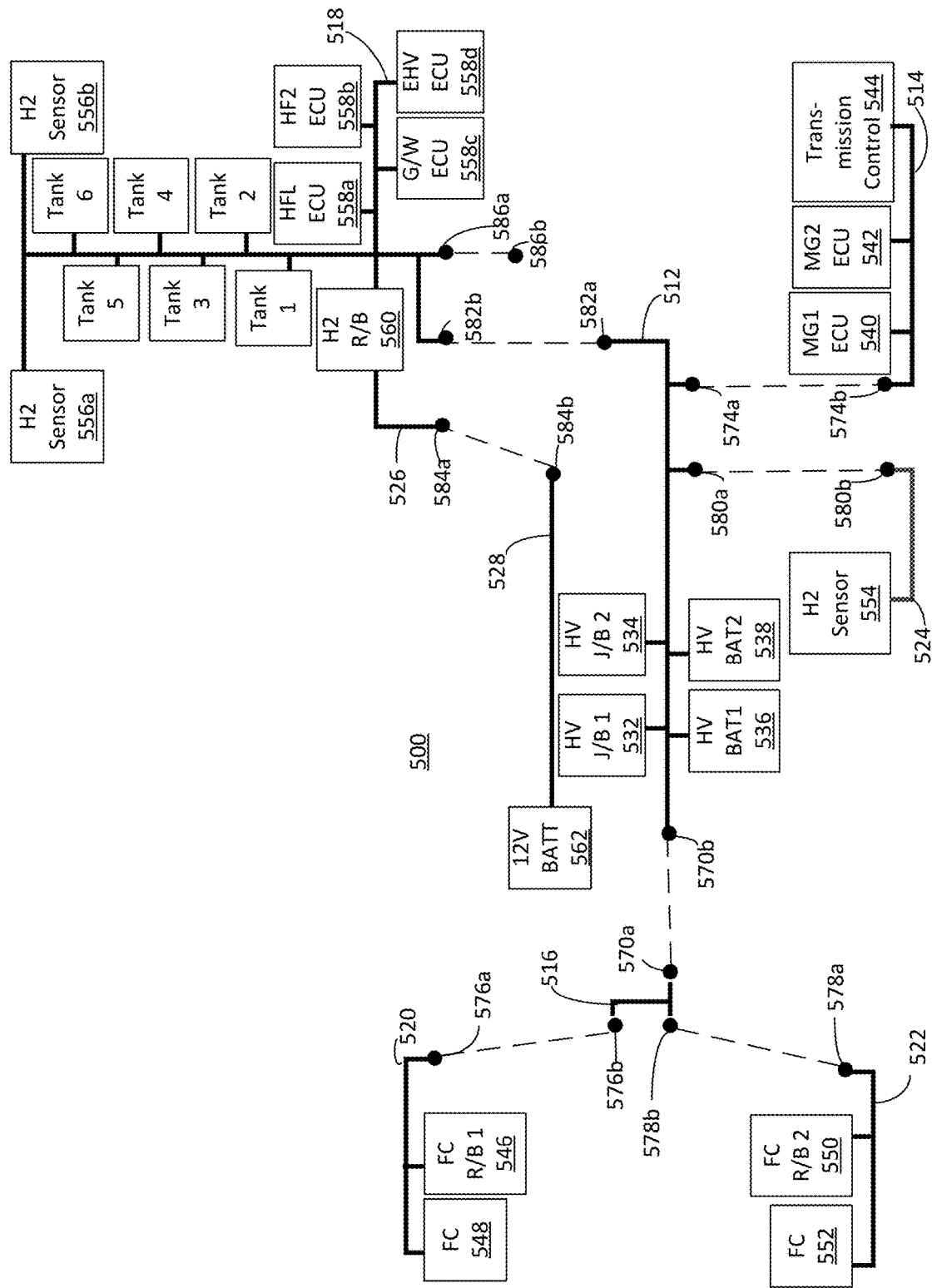
FIG. 5 is a schematic diagram of a low voltage system, including a modular harness that may be used in the system of FIG. 1 and/or with the system of FIG. 2.

FIG. 5 is a schematic diagram of a low voltage system 500, which illustrates an example modular electrical harness structure of modular harness 510 for a fuel cell vehicle that allows for mass production of fuel cell powertrain systems for a wide array of vocations that may be determined by the second entity. In various embodiments, modular harness 510 and each of the harnesses that make up the modules of modular harness 510 are electrical harnesses. In other embodiments, some of any of modules of modular harness 510 and/or some of the modules of harness 510 may carry optical communications and/or other varieties of communications. Throughout the specification, anywhere an electrical line for carrying electrical signal is mentioned an optical line (e.g. and optical fiber) for carrying optical signals, respectively, may be substituted to obtain a different embodiment (or another form of communications line may be substituted). Low voltage system 500 provides control signals and/or power to devices that control high voltage system 200. More specifically, a modular harness structure of modular harness 510 allows the first and/or second entity (e.g., an OEM) to add or subtract fuel cell modules from the fuel cell vehicle's powertrain system with minimal modification to overall system architecture, which may accommodate a variety of types of vehicles, such as heavy duty trucks from multiple OEMs and/or vehicles of a variety of chassis lengths. For example, a powertrain product may be designed to fit within a certain area and may have modular components that come with a variety of extensions and/or in a variety of sizes to accommodate the specific chassis length, and the same harness (e.g., modular harness 510) may have different connectors each accommodating one or more of the choices of components.

Modular harness 510 facilitates keeping the system scalable according to the number of fuel cell systems and battery systems combinations. Using modular harness 510, one can add or remove various options, by doing no more than changing the harness and/or harness configuration. In an embodiment, as mentioned above, at least two options may be provided to the second entity (e.g., an OEM). One option may be to provide just the power generation (e.g., the fuel cell system, the high voltage battery system, and hydrogen storage), and the other option may be to provide both the power generation system and the power consumption system (the motor-transmission system). Each power generation system (e.g., the main and the sub system)/power consumption pair may be electrically isolated.

In addition, structure of modular harness 510 may allow the second entity (e.g., an OEM) to choose between installing the manufacturer's e-drive system, and/or installing its own e-drive system. Finally, if the second entity (e.g., an OEM) chooses to install the first entity's or first subentity's e-drive system, the modularity of modular harness 510 allows the second entity (e.g., the OEM) to add or subtract e-drive components, with minimal modification to the architecture of the system.

In various embodiments, whichever choice of modular components are included in the final system (or however, one decides to modify system 100 from one combination of modular components to another combination of modular components), it may be just a matter of plugging the desired components to the matching connections on the modular harness 510. For example, if the second entity requires only a powertrain, then the powertrain component can be provided as a single component. Alternatively, if the second entity requests the inclusion of another e-drive component such as a motor, a transmission, and/or other ancillary devices, the e-drive component can easily be provided as a modular package.

The modular system and modular harness 510 may alternatively or additionally allow for the option of changing the number of fuel cell systems (e.g., down-sizing from multiple fuel cell systems to one fuel cell system) and/or change the type of fuel cell systems without redesigning the assembly. For example, modular harness 510 may allow for half the modular system to be removed without a need for part changes (e.g., with the need to change the harness).

In one example, a modular harness 510 is provided with a cap that can be removed and a different harness can be plugged in to allow different features and functionalities of adding the motor e-drive and transmission. In various embodiment, any of the Control Area Network (CAN) bus-related communication, discrete lines, and the like are now accessible to the e-drive component, based on hardware/module/plug-and-play situation. Optionally, each line may include logic circuits and that are controllable by an ECU (or other processor system to control the usage of the module connected to the line). In various embodiments, to keep the system modular the architecture that can handle two different types of fuel systems. In other words, the modularity of the powertrain allows for a choice of different types of systems (different types of fuel systems and/or different types of power generation systems), and allows for a choice of components that require a larger amount of power or a smaller amount of power requirement, as needed (in addition to the ability to choose which e-drive components are included), and accommodate different designs of the second entity. Thus, in certain examples, the powertrain uses two fuel cells, or two hydrogen fueling components. However, the architecture of low voltage system 500 is designed so that the architecture can easily be paired down to one fuel cell, or one motor, one kind of fueling system, or the like (the term "paired down" refers to removing components "paired down to one fuel cell or subsystem" means removing components until there is only one fuel cell or subsystem). Thus, the powertrain can be easily modified if one wants to change the power output requirements for meeting a different one of class 3 through 7 truck, where the change does not require the same amount of power to run different classes of trucks.

In various embodiments, not only may the fuel cells be stacked, but modular harness 510 also provides for plug and play integrations and connections for the e-drive, tanks, etc., and the modular system is also not tied to any specific number of fuel cells or components. For example, the modularity of modular harness 510 may allow for a choice between two parallel system or one parallel system, two fuel cells or one fuel cell and/or between two motors or one motor (or other numbers of parallel systems motors fuels cells and batteries), etc. The various harness modules of modular harness 510 and modules that plug into modular harness 510 can be plugged in, or not plugged in, and the final system still fully functions properly. In this example, system 100 includes low voltage system 500 having modular harness 510, which has a modular electrical harness structure.

Modular Harness 510

Modular harness 510 may include battery system harness 512, e-drive harness 514, fuel cell system harness 516, fuel tanks system harness 518, fuel cell module harnesses 520 and 522, hydrogen sensor harness 524, hydrogen relay box harness 526, and/or low voltage battery harness 526.

Each of the boxes of FIG. 5 that are connected to modular harness 510 represent both a device and an electrical connection that is specialized for that device. The electrical connection may be intentionally shaped, so as to mate with a connector on the device, so that only a device of the proper type can attach to the connector. Similarly, the wires within the connector may be specially wired so as to provide control signals to the device and connect the device and a controller that controls the device to one another. Likewise, connectors for the controllers are specially shaped for the controller that is supposed to connect to the modular harness 510, wire the controller to the locations on the harness that the device controlled by the controller are supposed to connect to.

Battery System Harness 512

In various embodiment, battery system harness 512 is a high voltage battery harness and/or a first entity's harness. Battery system harness 512 may be adapted to removably connect to a one or more electrical harnesses, as well as one or more electrical components, within system 100. In the specification battery system harness 512 may be referred to as the first harness, and battery system harness 512 may be the harness that is related to the components provided by the first subentity of the first entity. In the example illustrated in FIG. 5, battery system harness 512 may be removably connected to fuel cell system harness 516 at a single point of contact (which may have multiple conductive pins and/or sockets for pins), for example electrical connection points 570a, which connected to electrical connection point 570b. Battery system harness 512 can also be adapted to be removably connected to fuel tanks system harness 518, at a single point of contact, for example at connection point 582a, which connected to connection point 582b.

Battery system harness 512 may be adapted to be connected to (e.g., may have connection points for) other components of a fuel cell system in a vehicle. For example, battery system harness 512 can be adapted to connect to one or more high voltage junction boxes, such as high voltage junction boxes 532 and 534. Battery system harness 512 may also be adapted to connect to one or more high voltage batteries, such as high voltage batteries 536 and 538. Control signals may be communicated, via harness 512, through high voltage junction boxes 532 and 534 and/or to and from high voltage batteries 536 and 538. Alternatively or additionally, power may be transmitted through high voltage junction boxes 532 and 534 and/or from high voltage batteries 536 and 538 for powering other devices.

In addition, battery system harness 512 may be adapted to removably connect to e-drive harness 514 at a single point of contact, for example electrical connection point 574a and b. In an embodiment in which the motor-transmission system of motor system 166 is offered to the second entity (e.g., OEM) as an option, e-drive harness 514 may be part of the motor transmission option of the kit. In an embodiment harness 512 has only one interface for an e-drive harness and has only one interface for a fuel cells, so that there is only one harness that is part of a basic kit, which can be upgraded (e.g., by adding more harnesses), without adding more hardware.

E-Drive Harness 514

E-drive harness 514 may be used for sending control signals to motors 224 and 244, FC cell system 300, PCU system 320, battery 354, transmission 492, and/or or elements of motor system 166. In various embodiments, e-drive harness 514 may be removably attached to modular harness 510, and e-drive harness 514 may be provided together with second entity architecture 258 (e.g., when second entity architecture 258 is not provided, e-drive harness 514 may also not be provided). As will be discussed in greater detail below, e-drive harness 514 may be left out in the case when (a) a second entity provides its own e-drive system for system 100, or (b) the second entity (e.g., an OEM) initially installs the first entity's (e.g., a manufacturer's) e-drive system in system 100, but later decides to replace the first entity's e-drive system with another e-drive system. When e-drive harness 514 is excluded/removed from modular harness 510, a cap (and/or plug) may be placed on electrical connection point 574a, in order to insulate the wires of battery system harness 512 and/or to complete an electrical circuit.

In an embodiment, the removal/non-inclusion of e-drive harness 514 does not affect the functioning of the larger electrical harness system. The modular flexibility facilitates (e.g., by not requiring e-drive harness 514) adapting the harness to a large variety of system configurations.

As discussed above, e-drive harness 514 may be adapted to removably connect to battery system harness 512 at a single connection point. In addition, e-drive harness 514 may include a plurality of electrical branches adapted for removable connection to a common ECU for a plurality of electrical motors, and a transmission. Any number of connectors for motors may be included with e-drive harness 514. In an embodiment e-drive harness 512 includes a junction connector for connecting multiple motors. In the illustrated example embodiment of FIG. 5, e-drive harness 514 includes three electrical branches, removably connected to Motor-Generator 1 (MG1) Electrical Control Unit (ECU) 540, MG2 ECU 542, and transmission control 544.

In other embodiments, e-drive harness 514 may include additional electrical branches for connections to additional motors. In an embodiment, e-drive harness 514 supports (e.g., has electrical connections) for up to 6 motors and 1 transmission (in other embodiment, the maximum number of motors may be different). When an electrical branch of e-drive harness 514 is unused, the unused branch may be capped and the corresponding lines in the connection point between battery system harness 512 and e-drive harness 514 may be capped. By capping electrical connections to unused branches of e-drive harness 514, the second entity may add or subtract motors from the powertrain system without having to replace e-drive harness 514. For example, if an OEM (or other second entity) decided to downsize system 100 to a single motor, the OEM could remove motor ECU 540 and its associated motor, and place a cap on connection point to ECU 540 and/or the corresponding line in the connection point between battery system harness 512 and e-drive harness 514. Thus, the OEM (or other second entity) can downsize to a single motor with minimal modification to the overall system, for example.

The second entity may remove e-drive harness 514, along with the first entity's e-drive system, and install a different e-drive (e.g., a non-manufacturer e-drive system) with its own associated electrical harness, and electronic control system. Despite the removal of e-drive harness 514, the operation of modular harness 510 will be unaffected.

In various embodiments, upon connecting the transmission to transmission control 544, the system is able to control the transmission, and all of the motors that may interact with the transmission.

Fuel Cell System Harness 516

As discussed above, fuel cell system harness 516 may be removably connected to battery system harness 512 at a single point of contact, for example electrical connection point that is formed by connectors 570a and b. In some embodiments, fuel system harness 516 may include a plurality of electrical branches adapted for removable connection to a plurality of fuel cell system harnesses. In certain embodiments, these connections may be made using modular junction connectors. As will be discussed in greater detail below, each fuel cell system harness 516 provides electrical connections within an associated fuel cell module. In the illustrated example embodiment, fuel cell system harness 516 includes two electrical branches, removably connected to fuel cell module harnesses 520 and 522, at electrical connection points 576a and b and 578a and b, respectively. In other embodiments, fuel cell system harness 516 may include additional electrical branches for connection to additional fuel cell module harnesses.

In an embodiment harness 516 may have a connection for two fuel cells. Optionally, harness 516 may include a junction connection for connecting any number of fuel cells to harness 516. When an electrical branch of fuel cell module 516 is unused, it may be capped in a similar manner to capping battery system harness 512 when e-drive harness 514 is excluded/removed. By having the option to include or not include a module of the harness and capping the electrical connections that are not in use, a second entity may add or subtract fuel cell modules from the powertrain system without having to replace fuel cell system harness 516. For example, if the second entity decided to downsize vehicle 100 to a single fuel cell module (e.g., by removing all but one fuel cell module), the second entity could remove fuel cell module harness 522, along with its associated fuel cell modules, and simply place a cap on the connection point. Thus, the second entity can downsize to a single fuel cell with minimal modification to modular harness 510.

Fuel Tank Harness 518

Fuel tanks system harness 518 may connect to a variety of tanks, sensors, relay boxes, and/or ECUs, such as tanks 1-6, hydrogen sensors 556a and b, hydrogen relay box 560 and ECUs 558a-d.

Although FIG. 5 illustrates connections to 6 tanks, as an example, in various embodiments, there may be more than 6 tanks or fewer than 6 tanks. In various embodiments, each parallel system may be connected to 3 tanks (in various other embodiments, each parallel system may be connected to a different number of tanks and/or may be connected to a different number of tanks than other parallel systems). HFL ECU 558a is the main ECU for controlling the hydrogen fuel tanks. HF2 ECU 558b is an ECU fora parallel system of hydrogen fuel tanks. If there are no more than a threshold number of hydrogen fuel tanks (e.g., 3), then only the HFL ECU 588a is necessary. HF2 ECU 588b is not necessary if there are less than higher threshold of fuel tanks (e.g., 6 or less hydrogen fuel tanks), and then only the HFL ECU 588a and HF2 ECU 588b are necessary. More ECUs can be added to accommodate more fuel tanks. A local device may also be provided for communications between the HFL ECU 588a, HF2 ECU 588b, EHV ECU 588d.

G/W ECU 558c may convert messages from the second entity (e.g., the OEM) to a protocol used by the first entity, so that the second entity just needs to plug their ECU to harness 518 (e.g., via connectors 586a and 586b) without the need to know the protocol used by the first entity.

Electric hybrid vehicle (EHV) ECU 558d may be connected to the central control unit (e.g., control module 128G), which controls the high voltage batteries connected to HV BAT1 536 and HV BAT2 538 (e.g., high voltage battery modules 212 and 232) and the fuel cells connected to FC 548 and FC 552 (e.g., fuel cell systems 216 and 236). In various embodiments, low voltage system 500 allows the second entity to flexibly control multiple batteries, multiple fuel cells, and multiple drive motors using an easy interface. An EHV ECU may process control tasks and optimize various systems and parallel systems, thereby providing better service to the OEM. For example, once transmission control 544 is connected to the transmission, the EHV ECU that is connected to EHV ECU 558*d* can control the transmission. The EHV ECU connected to EHV ECU 558*d* may also control the motors (e.g. motors 224 and 244) connected to Motor-Generator1 (MG1) ECU 540 and MG2 ECU 542. In an embodiment, the EHV ECU that is connected to the connector EHV ECU 558*d* may include multiple copies of the logic for controlling the fuel cells systems and the high voltage battery systems and/or may run multiple instances of the same logic, so that multiple parallel can be added or removed without the need for making any changes to the EHV ECU (in various embodiments, each fuel cell system is paired with a high voltage battery system, and all of the fuel cell/high voltage pairs are added/connected to run in parallel with the other fuel cell/high voltage battery pairs). In various embodiments, fuel tanks system harness 518 connects to the components added at a second location or subentity (e.g., the location of manufacturer 2), whereas battery system harness 512 connects to the part of the system built at a first location or subentity (e.g., the location of manufacturer 1).

In various embodiments, a separate bus may be provided for the devices connected to harness 514 and EHV ECU 558*d*.

Harness 518 includes a connection point, formed by connectors 586*a* and 586*b*, for the second entity (e.g., the OEM) to attach another harness and/or other wiring.

Fuel Cell Module Harnesses 520 and 522

Fuel cell module harnesses 520 and 522 may include connections to fuel cell relay boxes 546 and 550 (for controlling the connection of the fuel cells to the motors), respectively, and to fuel cells 548 and 552 (for sending control signals to fuel cells 548 and 552 and to receive information related to the current state of fuel cells 548 and 552), respectively. Fuel cells 548 and 552 may be fuel cell system 216 and 236, respectively, which may be fuel cell stack 302.

As discussed above, fuel cell module harnesses 520 and 522 may be removably connected to fuel cell system harness 516, allowing the second entity to add or remove fuel cell modules from the powertrain system of a vehicle with minimal modification to system architecture. Aside from connecting each fuel cell module to the larger electrical harness system, each fuel cell module harness may provide for electrical connections to individual components within a fuel cell module. In some embodiments, each fuel cell module harness may provide electrical connections to fuel cells of a fuel cell stack, sensors, ECUs, and/or sensors.

Hydrogen Sensor Harness 524

Hydrogen sensor harness 524 may be connected to one or more hydrogen sensors 554, for communicating information about the amount of hydrogen remaining in a hydrogen tank to one or more ECUs.

In various embodiment, the hydrogen relay box connector 560 is connected to hydrogen relay box 560, which connects to 12 volt battery 562 of harness 524, which is the connection point formed by connectors 584 *a* and *b*, and low voltage battery harness 526. In various embodiments, each pair of connectors 570 *a* and *b* through 584 *a* and *b* may removably mate together (e.g., in male and female pairs) and may include one or more lines, some of which may be capped, if the line is associated with a component that is not being used in the configuration being assembled. In various embodiments, connectors 570 *a* and *b* through 584 *a* and *b* are "inline" connectors (or cable connectors) that are permanently attached to a cable, so that the connector can be plugged into another terminal (either a stationary instrument or another cable). In other words, each of connectors 570 *a* and *b* through 584 *a* and *b* are one integral unit, and by connecting the integral unit a (on device of harness a) to the integral unit b (which mates with integral unit b and is on device b) all of the electrical connections of the two units a and b that need to be connected are thereby electrically connected (where integral unit and integral unit b can be any of connectors 570 *a* and *b* through 584 *a* and *b*, respectively). Stated differently, in various embodiments, each pair of connectors 570 *a* and *b* through 584 *a* and *b* form a wire-to-wire connector on the harnesses itself that can be connected or capped depending on the modularity of the specific vocation.

The components that are connected to modular harness 510 (which may thereby be communicatively connected to one another), may communicate with one another using any of a number of communication protocols. For example, the protocol may be any protocol that is compliant and/or compatible with any onboard diagnostics (OBD) standard in use in the vehicle. For example, the communications protocol may be an OBD II compliant protocol. As another example, the protocol may be or may be part of a CAN bus. In an embodiment, the protocol may allow microcontrollers (e.g., the ECUs of this specification) and other devices (e.g., sensor system 122, processor system 124, memory 126, control modules 128, fuel cell system 160, battery system 162, fuel tank system 164 (which may include a hydrogen storage system), motor system 166, fuel cell module 212 and 232, high voltage battery module 214 and 234, and/or electric motor 224 and 244, and/or high voltage junction boxes, HV J/B 1 216 and HV J/B 2 236) to communicate with one another. The communications may occur, via frames being broadcast to all devices sharing a common bus, where the frames may include one or more identifiers identifying the intended recipient-device and/or the sending-device. In an embodiment, fuel cell module 212 and 232, high voltage battery module 214 and 234, and/or electric motor 224 and 244, and/or high voltage junction boxes, HV J/B 1 216 and HV J/B 2 236 share a common bus (e.g., a CAN bus).

FIG. 6 illustrates an embodiment of an example of a connector 600, which includes capped lines 602 *a* and *b* and uncapped lines 604*a-j*. Capped lines 602 *a* and *b* are electrical lines (or other lines) for components that are not being used in the present configuration and uncapped lines 604*a-j* are electrical lines for components that are in use in the present configuration. The cross hatching on capped lines 602 *a* and *b* indicate that the opening is plugged or sealed, but the plug or seal is not necessarily a smooth surface. Similarly, the circle within uncapped lines 604*a-j* indicates that the opening is not plugged but the structure within the opening may be reasonably complex. Connector 600 may be any of connectors 570 *a* and *b* through 584 *a* and *b*. For example, capped lines 602 *a* and *b* may the lines for connecting a parallel system (e.g., parallel system 2, which is not the main system). As another example, only of one of capped lines 602 *a* and *b* is capped, which may be for the E-drive harness 514.

FIG. 7 illustrates a circuit diagram 700 representing the circuit of a cap. In circuit diagram 700, cap 602*a* includes one or more wires, such as wires 704, 706, etc., that complete circuits on a harness, via connector 708. Connector 708 may include one or more pairs of wires, such as pairs of wires 710a and b, 712a and b, etc., in which each may have a higher voltage wire and a lower voltage and/or a ground wire. Optionally, multiple higher voltage wires may share the same ground wire. Each of wires 704, 706, etc. may include a high side and a low side, in which the high side connects to a higher voltage wire and the low side connect to a corresponding lower voltage wire, such as the negative side of a power source (or ground, and if the lower voltage wire of the corresponding the higher voltage wire to which wire 704 is connected to is ground, using wire 704 as an example). Were the circuit not closed by cap 602a, EHV ECU 558d may interpret the open circuit as a system that is not functioning properly, and EHV ECU 558d may shut down system 100, whereas EHV ECU 558d may interpret the closed circuit as the component being intentionally not present. Alternatively or additionally, any of wires 704, 706 . . . may be attached to a passive circuit that, in response to control signals from an ECU, produce a signal that either is interpreted as the component being intentionally left out or mimics a signal that is normally produced by the missing component, but which does not lead to the system 100 relying on the missing component for meeting any of the needs (e.g. torque requests or power requests) for system 100. Connector 708 may be the connector for any of HV J/B 2 534, HVBAT2 538, HF2 ECU 558b, HF2 sensor 556b, G/W ECU 558c, tanks 3-6, connectors 574a, 578b, for example. For an optical line, the wires 704 and 706 may be optical fibers and/or may include a light source and/or a mirror to return to a detector that communicates with an ECU.

FIG. 8 illustrates an embodiment a method 800 of using the system of FIGS. 1-7. In step 802, a system for making a variety of modules for system 100 is provided for a first entity, such as a manufacturer. For example, the system may be capable of manufacturing modular fuel cells for FC stack 302, the components of FIGS. 1-4 and the modules of modular harness 510 of low voltage system 500. In step 804, a determination is made regarding the requirements and/or structure for a vehicle and the configuration of modules needed to meet those requirements and/or structure. For example, the number of parallel systems and the types of each of the parallel system for powering the vehicle is determined. For example, a determination is made whether a first entity will be supplying the components of architecture 258, the transmission, electrical inverters 220 and 242, and/or electric motors 224 and 244.

Then, in step 806, based on the determination of the structure and or requirements of the vehicle, a determination is made as to which modules of systems of FIGS. 1-5, of the modules and/or lines of each module of the harness will not be needed and which will be needed. Next, in step 808, the modules (of the high voltage and/or low voltage system—e.g., the modules of FIGS. 1-5) that are needed are manufactured and/or assembled. For example, one or more of the modules may not exist, yet, and may be manufactured and then the modules may be attached to one another as needed. Conversely, one or more the modules may have already been manufactured and only need to be attached to the other modules.

In step 810 and/or as part of step 808, the lines of modular harness 510 of low voltage system 500 that will not be needed are capped, and the components of modular harness 510 that are needed are supplied with the lines that are not needed capped. In an embodiment, the difference between the structure of the harness provided is in which lines are capped and/or which modules of modular harness 510 (which depends on the configuration of modules being assembled). Otherwise, for each module of the harness structure 500 that is provided, the only differences in structure of the individual modules are which lines capped and/or which lines are not capped. By just changing which lines are capped and/or which lines are not capped, the same harness modules can be sued for a variety of configurations of the modules of the vehicle.

In step 812, the modules assembled and the harness of steps 808 and 810 are transported or otherwise provided to a second entity (e.g., an OEM), and the first subentity completes the assembly and/or a portion of the assembly using the assembly and/or modules provided by the first subentity.

Optionally, steps 802-812 may be repeated multiple times. For example, there may be multiple OEMs and/or the manufacturer may have different facilities, which may have different locations, and facility of the manufacturer and/or each OEM may build a different portion of the vehicle. Similarly, if there are two or more OEMs, the first OEM may have a system of modular parts that added to the vehicle prior to providing the vehicle to the next and/or second OEM and/or sold to the second OEM and added to the vehicle by the next and/or second OEM. The capping of various lines of the harness may be performed by any of the entities in the chain of manufacturers that collaborate to produce the system 100 (or another vehicle). Optionally, different entities in the manufacturing chain may cap different lines of the harness, as needed.

FIG. 9 illustrates an embodiment of a method of changing the configuration of modules that will be used in a vehicle. In step 902, a first electrical harness is removed from a first set of modular components of an engine of the vehicle, which has a first modular configuration. The removing of the harness may electrically detach a first electrical harness from a plurality of modular components that formed the first modular configuration to which the first electrical harness was previously in contact with. The first harness may have a plurality of electrical lines that are electrically isolated from one another, and prior to removing the first harness, at least one the electrical lines is attached to plurality of modular components.

In step 904, the configuration of modules is changed. For example, at least one module may be added and/or at least one module maybe removed from the first set of modules (having the first modular configuration) of the vehicle, resulting in a second set of modules, which form a second modular configuration, that includes at least one module. As another example, the first and second configuration of modules may each use the set of modules, but the configuration in which the modules are used differs such that a different set of lines of modular harness 510 are used (e.g., perhaps two modules that in one configuration were placed in parallel, in another configuration are placed in series).

In step 906, a second harness is electrically attached to the second set of modules. The first harness and the second harness may be structurally the same, except that at least one of the lines of the first electrical harness that is capped is not capped on the second electrical harness and/or at least one of the lines of the second electrical harness is capped that was not capped on the first electrical harness. More specifically, a line for a module that is part of the first configuration of the modules and not part of the second set of modules will be capped on the second harness but not on the first. Similarly, a line for a module that is part of the second configuration of the modules and not part of the first set of modules will be capped on the first harness but not on the second harness. Step 906 may be part of step 904 and/or step 904 and 906 may be performed as one step. In an embodiment, in method 900, the only structural differences that needs to be made to modify the vehicle is to rearrange the configuration of modules (which may include adding and/or removing one or more modules), and capping and/or uncapping different lines of modular harness 510.

The methods of FIGS. 8 and 9 may be used with any of embodiments FIGS. 1-7 (and/or with any other embodiments of this specification).

Figure 10:
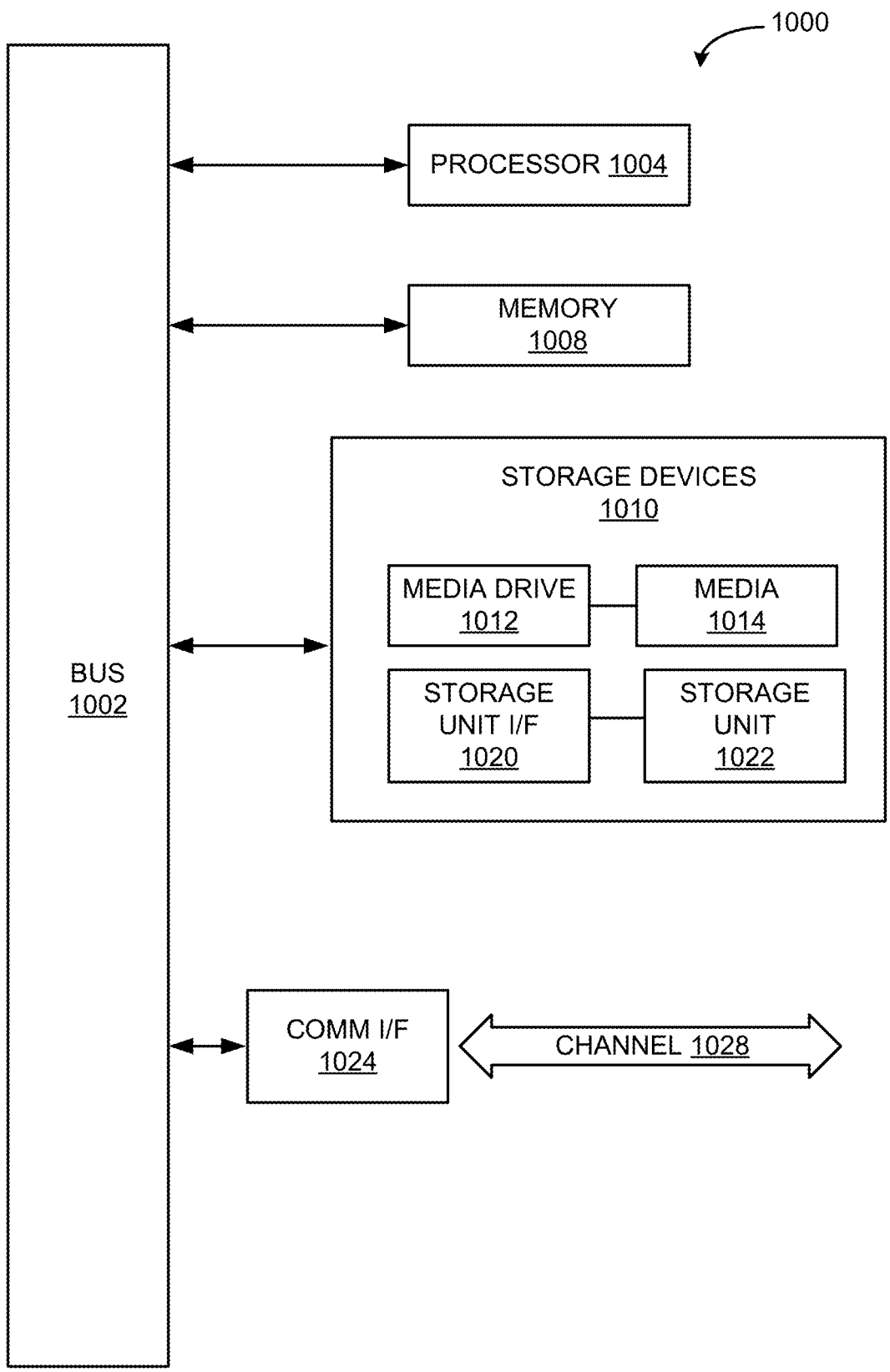
FIG. 10 illustrates a computing component that may be used with the systems of FIGS. 1-9 to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionalities can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 10. Various embodiments are described in terms of this example-computing component 1000. After reading this description, it will become apparent to a person skilled in the relevant art how to implement the application using other computing components or architectures.

Referring now to FIG. 10, computing component 1000 may represent, for example, computing or processing capabilities found within a self-adjusting display and/or the ECUs of vehicle system 100. Computing component 1000 might also represent computing capabilities embedded within or otherwise available to a given component of system 100. Any of the ECUs of system 100 and/or control modules 128 may be a computing component 1000.

Computing component 1000 might include, for example, one or more processors, controllers, control components, or other processing devices. This can include a processor, and/or any one or more of the components making up system 100. Processor 1004 might be implemented using a general-purpose or special-purpose processing engine such as, for example, a microprocessor, controller, or other control logic. Processor 1004 may be included within or may include processor system 124. Processor 1004 may be connected to a bus 1002. However, any communication medium can be used to facilitate interaction with other components of computing component 1000 or to communicate externally.

Computing component 1000 might also include one or more memory components, simply referred to herein as main memory 1008. Main memory 1008 may include, or may be included within, memory 126. For example, random access memory (RAM) or other dynamic memory, might be used for storing information and instructions to be executed by processor 1004. Main memory 1008 might also be used for storing temporary variables or other intermediate information during execution of instructions to be executed by processor 1004. Computing component 1000 might likewise include a read only memory ("ROM") or other static storage device coupled to bus 1002 for storing static information and instructions for processor 1004.

The computing component 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid-state drive, a magnetic tape drive, an optical drive, or other removable or fixed media drive might be provided. Storage media 1014 might include, for example, a hard disk, an integrated circuit assembly, optical disk, a CD or DVD. Storage media 1014 may be any other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing component 1000. Such instrumentalities might include, for example, a fixed or removable storage unit 1022 and an interface 1020.

Computing component 1000 might also include a communications interface 1024. Communications interface 1024 might be used to allow software and data to be transferred between computing component 1000 and external devices and/or between different components of system 100. Examples of communications interface 1024 might include a modem or soft modem, a network interface (such as Ethernet, network interface card, IEEE 802.XX or another interface). Software/data transferred via communications interface 1024 may be carried on signals, which can be electronic, electromagnetic (which includes optical) or other signals capable of being exchanged by a given communications interface 1024. These signals might be provided to communications interface 1024 via a channel 1028. Channel 1028 might carry signals and might be implemented using a wired or wireless communication medium. Some examples of a channel might include an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1000 to perform features or functions of the present application as discussed herein.

In an alternative embodiment, any of the ECUs of system 100 may be logic circuits specially design to perform the functions that describe in this specification.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A modular harness comprising:
   a battery system harness comprising:
      a battery system harness-to-fuel-cell system harness connector removably connected to a fuel cell system harness-to-battery system harness connector of a fuel cell system harness, and
      a battery system harness-to-battery connector removably connected to a battery of a vehicle; and
   the fuel cell system comprising:
      the fuel cell system harness-to-battery system harness connector,
      a fuel cell system harness-to-first fuel cell module harness connector removably connected to a first fuel cell module harness-to-fuel cell system harness connector of a first fuel cell module harness, and
      a fuel cell system harness-to-second fuel cell module harness connector removably connected to a second fuel cell module harness-to-fuel cell system harness connector of a second fuel cell module harness.

2. The modular harness of claim 1, further comprising:
   the first fuel cell module harness comprising:
      the first fuel cell module harness-to-fuel cell system harness connector, and
      a first fuel cell module harness-to-fuel cell connector removably connected to a first fuel cell of the vehicle; and
   the second fuel cell module harness comprising:
      the second fuel cell module harness-to-fuel cell system harness connector, and
      a second fuel cell module harness-to-fuel cell connector removably connected to a second fuel cell of the vehicle.

3. The modular harness of claim 1, wherein the battery system harness further comprises a battery system harness-to-junction box connector removably connected to a junction box of the vehicle.

4. The modular harness of claim 1, wherein the battery system harness further comprises a battery system harness-to-e-drive harness connector removably connected to an e-drive harness-to-battery system harness connector of an e-drive harness.

5. The modular harness of claim 4, further comprising:
   the e-drive harness comprising:
      the e-drive harness-to-battery system harness connector;
      an e-drive harness-to-first motor-generator connector removably connected to a first motor-generator electronic control unit (ECU) of the vehicle; and
      an e-drive harness-to-second motor-generator connector removably connected to a second motor-generator ECU of the vehicle.

6. The modular harness of claim 1, wherein the battery system harness further comprises a battery system harness-to-hydrogen relay box harness connector removably connected to a hydrogen relay box harness-to-battery system harness connector of a hydrogen relay box harness.

7. The modular harness of claim 6, further comprising:
   the hydrogen relay box harness comprising:
      the hydrogen relay box harness-to-battery system harness connector;
      a hydrogen relay box harness-to-hydrogen relay box connector removably connected to a hydrogen relay box of the vehicle;
      a hydrogen relay box harness-to-hydrogen fuel tank ECU connector removably connected to a hydrogen fuel tank ECU of the vehicle; and
      a hydrogen relay box harness-to-hydrogen fuel tank connector removably connected to a hydrogen fuel tank of the vehicle.

8. The modular harness of claim 7, wherein:
   the hydrogen relay box harness further comprises a hydrogen relay box harness-to-low voltage battery harness connector removably connected to a low voltage battery harness-to-hydrogen relay box harness connector of a low voltage battery harness; and the modular harness further comprises the low voltage battery harness comprising:
  the low voltage battery harness-to-hydrogen relay box harness connector, and
  a low voltage battery harness-to-low voltage battery connector to connect to a low voltage battery of the vehicle having lower voltage than the battery of the vehicle.

9. The modular harness of claim 1, wherein the battery system harness further comprises a battery system harness-to-hydrogen sensor connector removably connected to a hydrogen sensor harness-to-battery system harness connector of a hydrogen sensor harness.

10. The modular harness of claim 9, further comprising:
the hydrogen sensor harness comprising:
  the hydrogen sensor harness-to-battery system harness connector, and
  a hydrogen sensor harness-to-hydrogen sensor connector removably connected to a hydrogen sensor of the vehicle.

11. A modular vehicle system comprising:
a fuel cell system harness comprising:
  a fuel cell system harness-to-first fuel cell module harness connector removably connected to a first fuel cell module harness-to-fuel cell system harness connector of a first fuel cell module harness, and
  a fuel cell system harness-to-second fuel cell module harness connector removably connected to a second fuel cell module harness-to-fuel cell system harness connector of a second fuel cell module harness;
the first fuel cell module harness comprising:
  the first fuel cell module harness-to-fuel cell system harness connector, and
  a first fuel cell module harness-to-fuel cell connector removably connected to a first fuel cell;
the first fuel cell;
the second fuel cell module harness comprising:
  the second fuel cell module harness-to-fuel cell system harness connector, and
  a second fuel cell module harness-to-fuel cell connector removably connected to a second fuel cell of the vehicle; and
the second fuel cell.

12. The modular vehicle system 11, wherein:
the fuel cell system harness further comprises a fuel cell system harness-to-battery system connector removably connected to a battery system-to-fuel cell system harness connector of a battery system harness; and
the modular vehicle system further comprises:
  the battery system harness comprising:
    the battery system harness-to-fuel cell system harness connector, and
    a battery system harness-to-battery connector removably connected to a battery; and
  the battery.

13. The modular vehicle system 12, wherein:
the battery system harness further comprises a battery system harness-to-junction box connector removably connected to a junction box; and
the modular vehicle system further comprises the junction box.

14. The modular vehicle system 12, wherein the battery system harness further comprises a battery system harness-to-e-drive harness connector removably connected to an e-drive harness-to-battery system harness connector of an e-drive harness.

15. The modular vehicle system 14, further comprising:
the e-drive harness comprising:
  the e-drive harness-to-battery system harness connector;
  an e-drive harness-to-first motor-generator connector removably connected to a first motor-generator electronic control unit (ECU); and
  an e-drive harness-to-second motor-generator connector removably connected to a second motor-generator ECU;
the first motor-generator ECU; and
the second motor-generator ECU.

16. The modular vehicle system 12, wherein the battery system harness further comprises a battery system harness-to-hydrogen relay box harness connector removably connected to a hydrogen relay box harness-to-battery system harness connector of a hydrogen relay box harness.

17. The modular vehicle system 16, further comprising:
the hydrogen relay box harness comprising:
  the hydrogen relay box harness-to-battery system harness connector;
  a hydrogen relay box harness-to-hydrogen relay box connector removably connected to a hydrogen relay box;
  a hydrogen relay box harness-to-hydrogen fuel tank ECU connector removably connected to a hydrogen fuel tank ECU; and
  a hydrogen relay box harness-to-hydrogen fuel tank connector removably connected to a hydrogen fuel tank;
the hydrogen relay box;
the hydrogen fuel tank ECU; and
the hydrogen fuel tank.

18. The modular vehicle system 17, wherein:
the hydrogen relay box harness further comprises a hydrogen relay box harness-to-low voltage battery harness connector removably connected to a low voltage battery harness-to-hydrogen relay box harness connector of a low voltage battery harness; and
the modular vehicle system further comprises:
  the low voltage battery harness comprising:
    the low voltage battery harness-to-hydrogen relay box harness connector,
    a low voltage battery harness-to-low voltage battery connector to connect to a low voltage battery; and
  the low voltage battery having a lower voltage than the battery.

19. The modular vehicle system 12, wherein the battery system harness further comprises a battery system harness-to-hydrogen sensor connector removably connected to a hydrogen sensor harness-to-battery system harness connector of a hydrogen sensor harness.

20. The modular vehicle system 19, further comprising:
the hydrogen sensor harness comprising:
  the hydrogen sensor harness-to-battery system harness connector, and
  a hydrogen sensor harness-to-hydrogen sensor connector removably connected to a hydrogen sensor; and
the hydrogen sensor.

* * * * *